(12) United States Patent
Börjesson

(10) Patent No.: US 9,489,473 B2
(45) Date of Patent: Nov. 8, 2016

(54) COMPUTER IMPLEMENTED METHOD FOR PRODUCT DESIGN

(71) Applicant: Modular Management USA, Inc., Bloomington, MN (US)

(72) Inventor: Jan Fredrik Sebastian Börjesson, Eden Prairie, MN (US)

(73) Assignee: MODULAR MANAGEMENT USA, INC., Bloomington, MN (US)

( * ) Notice: Subject to any disclaimer, the term of this patent is extended or adjusted under 35 U.S.C. 154(b) by 849 days.

(21) Appl. No.: 13/833,152

(22) Filed: Mar. 15, 2013

(65) Prior Publication Data

US 2013/0346036 A1    Dec. 26, 2013

Related U.S. Application Data

(60) Provisional application No. 61/662,516, filed on Jun. 21, 2012.

(51) Int. Cl.
*G06F 7/60* (2006.01)
*G06F 17/50* (2006.01)

(52) U.S. Cl.
CPC .......... *G06F 17/50* (2013.01); *G06F 2217/02* (2013.01)

(58) Field of Classification Search
CPC .................................. G06F 7/60; G06F 17/16
USPC ............................................................ 703/2
See application file for complete search history.

(56) References Cited

PUBLICATIONS

Bonjour et al., "Defining product architectures", 2008, Extended Product and Process Analysis and Design, EXPPAND'08, pp. 1-9.*

Michael Blackenfelt, "Modularisation by Relational Matrices—a Method for the Consideration of Strategic and Functional Aspects", 2001, Design for Configuration, Springer Berlin Heidelberg, pp. 134-152.*

Mark W. Lange, "CONCAD Bridging: Managing the Integration of Technical Solutions in a Modularize Product Concept", 1999, Integrated Design and Manufacturing in Mechanical Engineering'98. Springer Netherlands, pp. 521-528.*

Van Beek et al., "Modular Design of Mechatronic Systems with Function Modeling", Dec. 2010, Mechatronics Journal, vol. 20, pp. 1-24.*

Arciniegas et al., "Optimal Component Sharing in a Product Family by Simultaneous Consideration of Minimum Description Length and Impact Metric", 2011, Engineering Optimization, vol. 43, pp. 175-192.*

(Continued)

*Primary Examiner* — Kamini S Shah
*Assistant Examiner* — Juan Ochoa
(74) *Attorney, Agent, or Firm* — Steven M. Koehler; Westman, Champlin & Koehler, P.A.

(57) ABSTRACT

A computer program product and a computer-implemented method are disclosed. The method includes providing a square design structure matrix having a number of rows and a number of columns equal to the number of rows, wherein each row represents one of a plurality of elements, wherein each entry of the design structure matrix is a numerical quantity; providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity; and using a computer processor to group one or more elements into a cluster arrangement, using a plurality of entries from each of the matrices.

16 Claims, 22 Drawing Sheets

(56) References Cited

PUBLICATIONS

Ali A. Yassine, "Multi-Domain DSM: Simultaneous Optimization of Product, Process & People DSMs", 2010, Proceedings of the 12th International DSM Conference, Cambridge, UK, pp. 319-332.*

Borjesson, F. (2010) A Systematic Qualitative Comparison of Five Approaches to Modularity. 11th International Design Conference, Design 2010, Dubrovnik, Croatia, May 17-20.

Borjesson, F., Hölttä-Otto, K. (2012) Improved Clustering Algorithm for Design Structure Matrix. Proceedings of the ASME 2012 International Design Engineering Technical Conferences & Computers and Information in Engineering Conference IDETC/CIE 2012, Aug. 12-15, Chicago, IL, USA, DETC2012-70076.

Erixon, G. (1998) Modular Function Deployment—A method for Product Modularisation. PhD thesis, The Royal Institute of Technology, Stockholm.

Gutierrez Fernandez, C. I. (1998) Integration Analysis of Product Architecture to Support Effective Team Co-Location. Master's Thesis at Massachusetts Institute of Technology, Department of Mechanical Engineering.

Li, S. (2011) A matrix-based clustering approach for the decomposition of design problems. Res. Eng. Design 22:263-278, DOI 10.1007/s00163-011-0111-z, ISSN 0934-9839.

Malmqvist, J. (2002) A Classification of Matrix-Based Methods for Product Modeling. Proceedings of International Design Conference—Design 2002, Dubrovnik—Croatia, May 14-17, pp. 203-210 (paper nr. 214).

Nilsson, P., Erixon, G. (1998) The Chart of Modular Function Deployment. Proceedings of 4th Workshop on Product Structuring, Delft University of Technology, Delft, The Netherlands.

Sellgren, U., Andersson, S. (2005) The Concept of Functional Surfaces as Carriers of Interactive Properties. Proceedings of International Conference on Engineering Design (ICED'05), Aug. 15-18, Melbourne, Australia.

Stake, R. B. (2000B) On Conceptual Development of Modular Products. Doctoral Thesis, Department of Production Engineering, Royal Institute of Technology, Stockholm, Sweden.

Stake, R. B. (2000A) Using cluster analysis to support the generation of modular concepts in the MFD-method. International CIRP Manufacturing Systems Seminar, Jun. 5-7, Stockholm, Sweden.

Suh, N. P. (1990) The Principles of Design. Oxford University Press, Inc., New York, NY 10016.

Thebeau, R. E. (2001A) Knowledge Management of System Interfaces and Interactions for Product Development Process. Master's Thesis at Massachusetts Institute of Technology, System Design & Management Program.

Thebeau, R. E. (2001B) Matlab program code. available at http://www.dsmweb.org/.

\* cited by examiner

|    | P1 | P2 | P3 | P7 | P4 | P5 | P6 |
|----|----|----|----|----|----|----|----|
|    |    |    | 9  | 9  | 3  | 3  |    |
|    | 3  |    | 1  | 3  | 9  |    |    |
|    | 1  |    | 3  | 1  | 3  |    | 1  |
|    | 1  |    | 3  | 3  | 9  |    |    |
|    |    | 1  |    | 1  | 9  | 9  |    |
|    |    |    |    | 1  | 1  | 9  | 3  |
|    | 1  | 3  |    |    |    | 3  | 9  |
|    |    |    | 1  | 3  | 3  |    |    |

|   | A | C | D | B | E | F | G | H |
|---|---|---|---|---|---|---|---|---|
| A |   |   |   | 1 | 1 |   |   |   |
| C | 1 |   |   |   | 1 |   |   |   |
| D | 1 | 2 |   |   |   |   |   |   |
| B |   |   | 1 |   |   |   |   |   |
| E |   |   |   | 2 |   |   |   | 2 |
| F |   |   |   |   | 1 |   | 1 | 1 |
| G |   |   |   |   |   |   |   | 2 |
| H |   |   |   |   | 1 |   |   |   |

COMPUTER IMPLEMENTED METHOD FOR PRODUCT DESIGN

CROSS REFERENCE TO RELATED APPLICATIONS

This application claims the benefit of priority from, and fully incorporates by reference, U.S. Provisional Application No. 61/662,516, filed Jun. 21, 2012, for "System & Method for Product Design."

FIELD OF INVENTION

The Present Application relates to computer-implemented methods for product design.

BACKGROUND

Product architecture is the scheme by which the function of a product is allocated to physical components. Clusters of physical components form modules. A module is a physical building block with standardized interfaces selected for company-specific reasons. Many practitioners and researchers have identified product family architecture as an effective response to the need for high and increasing variety in the marketplace, while reducing variety in the enterprise. Carefully selected standardized interfaces between "chunks" of components—often referred to as modules—allow companies to offer new configurations of features, styling, and performance levels without necessarily incurring new parts or redesigning from scratch.

Modules are typically generated by some pre-defined procedure operating on a model of the product in question. In general, module definition methods can be divided into two categories based on the data format: matrix based approaches and functional model based approaches. Within each of these types, the methods can also be categorized into coupling and similarity based approaches.

The functional model based methods are based on functional decomposition. Using these methods, the product is first modeled as a block diagram, and heuristic rules are then applied to form modules based on coupling or on function similarity. Matrix based methods, on the other hand, use matrix manipulation to form modules based on component, product property, or other relationship captures in the matrix. An exemplary similarity based matrix method is Modular Functional Deployment (MFD), and an exemplary coupling based matrix method is Design Structure Matrix (DSM).

Modular Functional Deployment (MFD) imposes the constraint that modules have standardized interfaces, selected for company-specific reasons. The standardized interfaces allow modules to be interchanged, resulting in a wide variety of products in an efficient manner. Approaches to modularity aim to create architectures based on modules. MFD was first presented by Erixon in 1998, with subsequent improvements described by Nilsson and Erixon in 1998. The use of Hierarchical Cluster Analysis (HCA) for module generation in MFD was first shown by Stake in 2000 and subsequently explored in more detail by Höltta-Otto, Tang and Otto in 2008.

Early clustering algorithms employ the idea of maximizing interactions within modules while simultaneously minimizing interactions between modules. A stochastic clustering algorithm using this principle operating on a Design Structure Matrix (DSM) was first found described by Idicula in 1995, with subsequent improvements presented by Gutierrez Fernandez in 1998 and Thebeau in 2001. The Idicula-Gutierrez-Thebeau Algorithm is referred to as IGTA.

DSM clustering approaches based on Genetic Algorithms (GA) are becoming the predominant approach for product family optimization. A drawback of GA may be the execution time. The GA by Yu, Yassine and Goldberg (2007) takes "about a day" to cluster an 80 element matrix.

Clustering algorithms, whether similarity- or coupling-based, assume any component can form a cluster with any other component. In the real world, however, that is not always true. A storage compartment for a vacuum cleaner accessory, for example, is not a stand-alone component but a feature of a molding, which in turn can attach to other molded parts if a hinge or snap-fit is present. Wyatt, Wynn, Jarrett & Clarkson (2012) propose a method to capture such considerations through constraints on the graph-based representation of a system, which allows the architectural "design space" for the system to be represented formally. By expressing the exploration of this design space as a state space search problem, possible "solution architectures" for the system may be generated computationally. Their example used a vacuum cleaner with 29 components and 50 connections, for which 1101 solutions were generated in 11 hours.

A method and program for problem clustering is disclosed in U.S. Pat. No. 7,280,986 to Goldberg, which is fully incorporated herein by reference. However, the Goldberg algorithm operates on a single square matrix and cannot be extended to two matrices. There remains a need for a clustering algorithm for product architecture that takes many factors into account and yet performs quickly and reliably.

SUMMARY

In one aspect, this disclosure describes a computer implemented method comprising: providing a square design structure matrix having a number of rows and a number of columns equal to the number of rows, wherein each row represents one of a plurality of elements, wherein each entry of the design structure matrix is a numerical quantity; providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity; and using a computer processor to group one or more elements into a cluster arrangement, using a plurality of entries from each of the design structure matrix and the domain mapping matrix.

In another aspect, the disclosure describes a computer program product comprising computer-executable instructions stored on a nontransitory computer readable medium that when executed by a computer processor cause the processor to perform a method comprising: providing a square design structure matrix having a number of rows and a number of columns equal to the number of rows, wherein each row represents one of a plurality of elements, wherein each entry of the design structure matrix is a numerical quantity; providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity; and using a computer processor to group one or more elements into a cluster arrangement, using a plurality of entries from each of the design structure matrix and the domain mapping matrix.

This disclosure, in its various combinations, either in method or product form, may also be characterized by the following listing of items:

1. A computer implemented method comprising:

providing a square design structure matrix having a number of rows and a number of columns equal to the number of rows, wherein each row represents one of a plurality of elements, wherein each entry of the design structure matrix is a numerical quantity;

providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity; and using a computer processor to group one or more elements into a cluster arrangement, using a plurality of entries from each of the design structure matrix and the domain mapping matrix.

2. The computer implemented method of item 1 wherein each of the elements corresponds to a component of an apparatus, and wherein each column of the domain mapping matrix represents one of a plurality of product properties of the apparatus.

3. The computer implemented method of any of items 1-2 wherein the domain mapping matrix is a Design Property Matrix or a Module Indication Matrix.

4. The computer implemented method of any of items 1-3 comprising defining an initial clustering arrangement wherein each element is placed in its own cluster, thereby defining a plurality of clusters.

5. The computer implemented method of item 4 further comprising:

selecting an element;

calculating an overall objective function for the selected element with respect to each of the plurality of clusters;

moving the selected element to a cluster to achieve a minimized overall objective function, thereby creating revised cluster arrangement; and storing the revised cluster arrangement as an optimized cluster arrangement.

6. The computer implemented method of item 5 further comprising:

maintaining a list of unselected elements;

selecting the element from the list; and deleting the selected element from the list.

7. The computer implemented method of item 6 wherein moving the selected element results in resetting the list of unselected elements to include all of the plurality of elements.

8. The computer implemented method of any of items 5-7 wherein the overall objective function comprises a first objective function obtained from the design structure matrix and a second objective function obtained from the domain mapping matrix.

9. The computer implemented method of item 8 wherein at least one of the first objective function and the second objective function is a Minimum Description Length.

10. The computer implemented method of any of items 1-9 wherein the plurality of elements are grouped into a plurality of clusters, and wherein none of the plurality of elements is grouped into more than one cluster.

11. The computer implemented method of item 10 wherein each entry of the design structure matrix corresponds to a strength of interaction between two of the plurality of elements, the method further comprising:

calculating a first objective function for the design structure matrix, wherein intracluster interactions between each pair elements of a first cluster are weighted by a value calculated based on a number of elements in the first cluster, and wherein intercluster interactions between pairs of elements of different clusters are weighted by a value calculated based on a total number of the plurality of elements.

12. The computer implemented method of item 11 further comprising:

calculating a second objective function for the domain mapping matrix, comprising representing scoring of a plurality of elements of the first cluster by a single equivalent row of scores.

13. The computer implemented method of item 12 wherein calculating a second objective function for the domain mapping matrix further comprises using pairwise scalar products of rows representing each of the plurality of clusters.

14. The computer implemented method of item 13 comprising using a Reangularity equation.

15. The computer implemented method of any of items 13-14 wherein normalizing terms of a scalar product comprises a self-adjusting prediction based on cluster size.

16. The computer implemented method of any of items 13-15 wherein the method calculates an overall objective function based on the first objective function for the design structure matrix and the second objective function for the domain mapping matrix.

17. The computer implemented method of item 16 wherein the overall objective function is a ratio having a numerator of a normalized sum of interactions between a selected element and the first cluster in the design structure matrix and a denominator of a score calculated from the Reangularity equation.

18. The computer implemented method of item 17 wherein the denominator is replaced by a multiplicative factor that corresponds to a non-linear decreasing function of Reangularity.

19. The computer implemented method of any of items 1-18 comprising defining an initial clustering arrangement wherein each element is placed in one of several randomly defined clusters of arbitrary size.

20. A computer program product comprising computer-executable instructions stored on a nontransitory computer readable medium that when executed by a computer processor cause the processor to perform a method comprising:

providing a square design structure matrix having a number of rows and a number of columns equal to the number of rows, wherein each row represents one of a plurality of elements, wherein each entry of the design structure matrix is a numerical quantity;

providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity; and using a computer processor to group one or more elements into a cluster arrangement, using a plurality of entries from each of the design structure matrix and the domain mapping matrix.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 5 shows the two input matrices used in the illustrative example.

FIG. 25 is a schematic comparing the clusters generated by R-IGTA and IGTA-plus.

Figure 1:
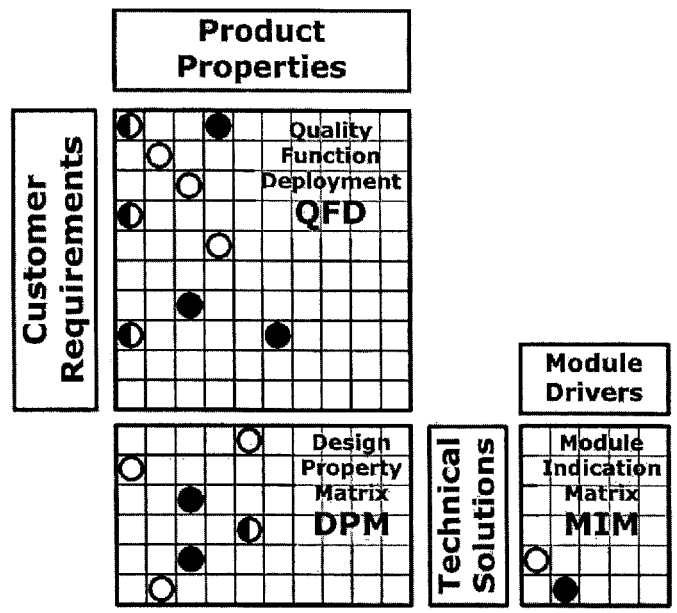
FIG. 1 is a visual representation of the data used in MFD.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The disclosure describes a hybrid module generation algorithm for use in a method for practical applications including defining modules for product design. The disclosed method balances independence and similarity, allowing product strategy to influence engineering-driven architecture considerations. An illustrated embodiment is disclosed for a cordless handheld vacuum cleaner, and the results are analyzed both statistically and qualitatively. The algorithm balances the engineering view of coupling-based methods such as Design Structure Matrix (DSM) with the strategic view of similarity-based methods such as Modular Function Deployment (MFD).

The depiction, arrangement and/or description of all of the various steps, interfaces, formulas and the like herein are done so for the purposes of understanding the purpose or role of such parts and should not be considered limiting, but rather that such steps, interfaces, formulas and the like can be combined together or separated as desired. For example, while a particular order of operations may be described, it is understood that a different order may also be performed.

As used herein, the following terms are defined as follows:

A "core" is a part of IGTA/IGTA-plus/R-IGTA responsible for moving one of several randomly selected elements from one cluster to another and keeping track of best solution so far.

A "cluster (noun)" is a collection of one or more elements.

A "cluster (verb)" means to generate a set of clusters by means of an algorithm.

A "component" is a simple physical entity that has an interaction with other simple physical entities. A technical solution is equivalent to a component. MFD traditionally refers to Technical Solutions and DSM traditionally refers to Components, but the terms are considered equivalent in this disclosure.

A "component-DSM" is a matrix of interactions between pairs of components.

A "customer requirement" is a statement of the experience the customer desires in their use of the product.

"DPM" is a Design Property Matrix, which is a matrix used to describe the relative impact of design changes to technical solutions on the performance of the product, as captured by product properties.

An "element" is a component or technical solution.

An "extra-cluster interaction" is an interaction between elements that belong to different clusters.

A "function (FU)" is a transformation of an input into an output, often expressed as verb plus noun, used primarily in analysis.

A "functional requirement (FR)" is a statement about a function performed by a product, used primarily in synthesis.

"IGTA" is the Idicula-Gutierrez-Thebeau Algorithm for clustering component-DSM, also known as Thebeau's algorithm.

"IGTA-plus" is a modification of IGTA that includes two algorithmic changes, SMA and ITC.

An "intra-cluster interaction" is an interaction between elements that belong to the same cluster.

An "interaction" is an exchange of energy, information, material or an association of physical space and alignment.

"ITC" is Improved Termination Criterion, selecting candidate elements from a list, and subsequently deleting the element from that list.

"Learning" is an adjustment of parameters used to predict scalar product, based on actual calculated scalar products and previous predictions.

"MFD" is Modular Function Deployment, a modularity method that involves populating and analyzing three interlinked matrices used to describe the relation between customer requirements, product properties, technical solutions, and module drivers.

"MIM" is Module Indication Matrix, a matrix used to describe the strategic intent of individual technical solutions, using module drivers.

A "module" is a cluster that forms a functional building block with specified interfaces, selected for company-specific reasons.

A "module driver" is one of 12 pre-defined company-specific strategic reasons for creating interfaces, used for describing the business intent of the product structure.

A "multicluster allocation" is a feature of IGTA where an element may be assigned to more than one cluster; occurs when more than one cluster returns the highest ClusterBid.

A "product property" is a precise, quantifiable statement about the performance level of certain functions of a product.

"Reangularity" is a metric between zero and one that measures the degree to which a design is uncoupled, extended here to cover modules.

"R-IGTA" is an exemplary embodiment of the currently disclosed algorithm, which is a modification of IOTA-plus to cluster simultaneously with regard to component-DSM and DPM/MIM, using ratio of TotalCost and Reangularity as an optimization criterion.

"SMA" is Suppressing Multicluster Allocation, allowing an element to be assigned to one and only one cluster.

A "technical solution" is a physical entity designed to embody product properties and carry a required function in the product. A technical solution is equivalent to a component. MFD traditionally refers to Technical Solutions and DSM traditionally refers to Components, but the terms are considered equivalent in this disclosure.

"TotalCost" is the total cost of intra-cluster interactions and extra-cluster interactions.

Variables used in equations in this disclosure are described as follows:

"ClusterBid$_j$" is the degree of fit between a selected element and each of the existing clusters, of which cluster j is one; calculation includes a penalty for ClusterSize$_j$ to prevent formation of very large Clusters.

Figure 2:
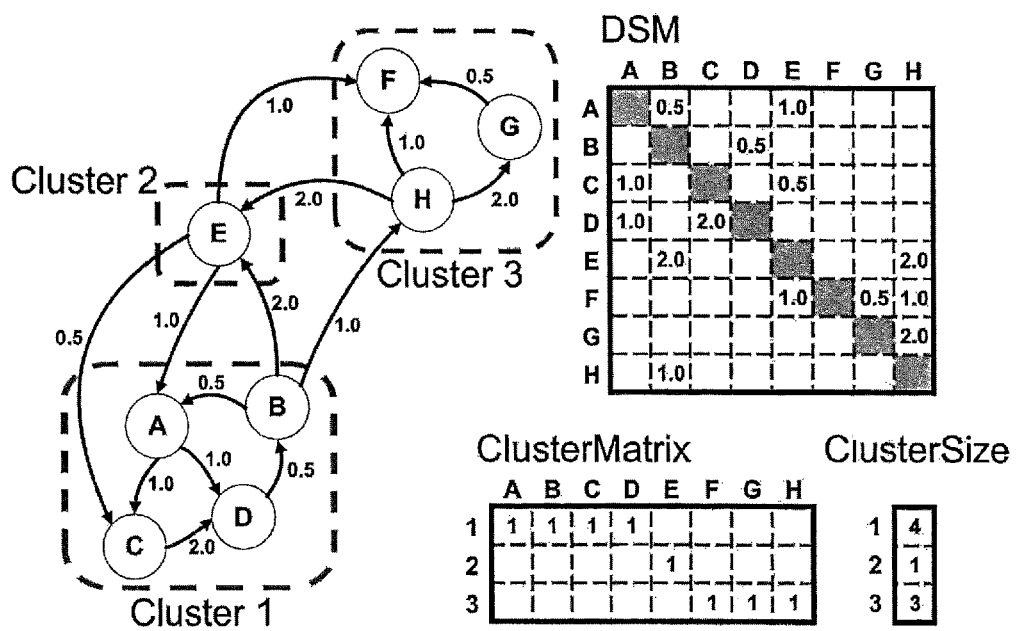
FIG. 2 is a schematic diagram illustrating an exemplary internal representation of clusters.

"ClusterMatrix$_{ij}$" is set to one if element j belongs to cluster i, otherwise zero, as shown in FIG. 2.

"ClusterSize$_j$" is the number of elements in cluster j, as shown in FIG. 2.

"DPM$_{ij}$" is the relative impact on product property j from a change to technical solution i.

"DPM2$_{ij}$" is the square of DPM(i,j) introduced to save computations.

"DSM$_{ij}$" is interaction between elements i and j.

"DSMSize" is the number of elements (rows) in DSM/DPM.

"E(inout)" is the expected value of inout calculated using a linear theoretically derived formula.

"E(scalar)" is the expected value of scalar calculated using a nonlinear empirically derived formula.

"Equiv$_{ij}$" is the equivalent score of cluster i for product property j, the purpose of which is to allow scalar products to be calculated between clusters and individual components.

"f(R)" is a nonlinear decreasing function of R used together with TotalCost as a global optimization criterion.

"Inout" is the sum of interactions between a randomly selected element and an existing cluster.

"N$_p$" is the number of product properties (columns) in DPM.

"powbid" is an exponent used to penalize the size of clusters in the formula for Clusterbid.

"powcc" is an exponent used to penalize the size of clusters in the formula for TotalCost.

"powdep" is an exponent used to emphasize strength of interactions in the formula for ClusterBid.

"R" is Reangularity, calculated using ClusterMatrix and DPM2.

"Scalar" is a scalar product between a randomly selected element and equivalent score of an existing cluster.

"TotalCost" is the sum of all intra-cluster interactions and extra-cluster interactions, with an additional penalty for the latter.

In a large organization such as a company that develops, manufactures and markets a range of products, there is a need to involve many stakeholders in the development process. With many stakeholders come a large amount of data to consider and often many different types of data such as details about target segments, relative importance of different customer requirements, performance levels, desired features, and styling variation, for example. Matrix-based methods are well suited for dealing with large amounts of data in a consistent fashion. At the end of the process of compiling and analyzing data, one of the desired outputs is a conceptual modular product architecture. Deriving this data can easily involve sorting one or several matrices with perhaps tens of thousands of elements. Computers are well suited for this task, but they need defined algorithms by which to operate. Two matrix based methods are incorporated into the disclosed concepts—component based DSM (Design Structure Matrix) and MFD (Modular Function Deployment).

MFD uses a similarity-based algorithm that looks for components that seem to have similar impact on product performance using product properties that are influenced by a similar company strategy, described by module drivers. In contrast, component-DSM uses a coupling-based algorithm that looks for components with strong interactions that naturally belong together, with as few interactions as possible outside of the modules, to enable parallel development and easy upgrading, for example. Each method has its own set of strengths and weaknesses. This disclosure is directed to an approach that draws on the strengths of both the DSM and MFD methods, to develop a computerized algorithm that balances the two views in generating modules: the component-interaction view of DSM and the strategic similarity view of MFD. The disclosed approach modifies a clustering algorithm for DSM to accommodate similarity-based clustering, as used in MFD. The disclosed algorithm is applied to a test case, and the results are discussed both statistically and qualitatively.

As shown in FIG. 1, MFD is chosen to assess components' similarity from strategic aspects when making modularity decisions. MFD uses three interlinked matrices to describe Voice of Customer, Voice of Engineering, and Voice of Company (e.g., the strategy). Strategy, in MFD, is described using 12 pre-defined Module Drivers (Table 1). The method is similar to Quality Function Deployment (QFD) by Hauser & Clausing (1988).

TABLE 1

Module Drivers adapted from Erixon (1998)

| Nr. | Driver | Refers to |
|---|---|---|
| 1 | Carry-over | Part of a product, or a sub-system of a product, that can be re-used. |
| 2 | Technology push | Part, or a sub-system, that is likely to go through a technology shift during its life cycle as a result of expected, radically changing, customer demands. |
| 3 | Planned design change | Part that carries attributes that will be changed according to a product plan. |
| 4 | Technical specification | Part with a performance-driving attribute that is varied to meet different customer demands. |
| 5 | Styling | Part that is influenced by trends, fashion, or brand-differentiation in such a way that shape or surface material characteristics vary. |
| 6 | Common unit | Part and sub-function that can be used throughout the entire assortment of products. |
| 7 | Process/ organization | Part that uses a scarce production or development resource, or where there are organizational reasons for separation. |
| 8 | Separate testability | Part with a function that may be tested separately, before final assembly. |
| 9 | Strategic supplier available | Part that may be developed and sourced from an external strategic partner, typically also affording a reduction of logistical costs. |
| 10 | Service/ maintenance | Part that will simplify service repair if it is easily detachable. |
| 11 | Upgrading | Part that may be changed after the initial purchase, to achieve a different level of product performance. |
| 12 | Recycling | Part that contains a material that will be separated before scrapping at product end of life. |

MFD is based on the idea of decomposing customer requirements into specific statements and linking them to measurable and controllable product properties, decomposing the product into technical solutions, describing how each technical solution impacts the performance on a particular product property, and grouping technical solutions carrying similar properties and strategic intent to define modules. FIG. 1 shows how the interlinked matrices are visualized in MFD. The use of circles (completely filled, partly filled, or not filled) replaces numerical entries. The translation from circle representation to numbers are arbitrary, but MFD commonly uses the following scheme: a fully filled circle signifies a "9", a half-filled circle a "3", a circle without fill is a "1", and the absence of a circle signifies "0."

In MFD, a Design Property Matrix (DPM) captures the relation between a technical solution (e.g., component) and a product property. A DPM is an example of a domain mapping matrix (DMM). A special matrix designated Module Indication Matrix (MIM) captures the strategic intent of each technical solution. The strategic intent is company-specific, which implies there is no single best architecture. This is because two different companies would describe their strategies differently, e.g., even for the same product, the MIM would look different. The grouping of technical solutions by product property and module drivers many be accomplished using statistical methods such as hierarchical clustering. Although such clustering algorithms are predictable, the different input data result in different clustering results.

DSM is a method for evaluating modularity decisions from a system coupling point of view. A Design Structure Matrix (DSM), sometimes also referred to as dependency structure matrix (Steward, 1981), is a method to represent product architecture. DSM has applications for defining modules from a component based matrix. Moreover, DSM has applications for complex systems including jet engines, gas turbines, helicopters and printing systems. Embodiments disclosed herein use component-DSM, where the rows and columns represent physical components of a product. In practice, component-DSMs are often symmetrical due to the nature of couplings. However, an asymmetrical DSM has more information content than a symmetrical one, since a distinction can be made between uni- and bi-directional interactions. The connections in the DSM can also be represented in terms of non-binary numbers, such as risk, difficulty of change, probability of change, or estimated strength of the connection.

In an exemplary embodiment, the disclosed concept represents interaction between any two pairs of technical solutions using a number that corresponds to the weight (or importance) of the interaction. A critical attachment may receive a higher value than a possible spatial interference, for example.

In an exemplary embodiment, a disclosed concept, referred to as R-IGTA, uses an algorithm for DSM clustering based on IGTA, but modified to take into consideration key matrices from MFD, namely DPM and MIM. Inclusion of the DPM and MIM matrices provides information about the similarity of individual components, in terms of the key product properties they influence, as well as the desired strategic intent of each one. A metric called Reangularity is included. Reangularity determines whether a given solution has a high level of orthogonality, implying that it is a good solution from an MFD-perspective. Reangularity is described in the following book, which is hereby incorporated by reference: Suh, Nam P., 1990, *The Principles of Design*, Oxford University Press, Inc., New York, N.Y. 10016, particularly at pages 115-117.

The IGTA algorithm performs DSM clustering. With two algorithmic modifications, the original algorithm (IGTA) is called IGTA-plus. IGTA-plus is an exemplary embodiment of an algorithm used in the disclosed product architecture modularization method. One modification is to Suppress Multicluster Allocation (SMA). This feature forces the algorithm to allocate an element to one and only one cluster. Two or more ClusterBids could take on the same value. If that value happens to be the highest value, the default behavior of IGTA is to allocate the selected element to all the clusters with that Clusterbid value. In contrast, SMA randomly assigns the selected element to only one of the clusters with the highest ClusterBid value. As a result, one of the two objective functions (TotalCost) may be calculated more efficiently using a matrix formula, which improves computational speed significantly. Moreover, the use of SMA results in more conclusive results, as an element is assigned to only one cluster.

The second modification, Improved Termination Criterion (ITC) uses a different mechanism to select elements randomly. With the ITC feature enabled, IGTA-plus maintains a list of elements that have not yet been selected for possible reassignment, eliminating unnecessary calculations. SMA and ITC can be enabled independently of one another, e.g., there are four possible combinations. The greatest speed improvement is obtained when both features are enabled. Taken together, SMA and ITC improve execution speed by a factor of about seven to eight times and the quality of the solutions obtained also increases.

The currently described R-IGTA algorithm performs DSM clustering with capabilities for SMA and ITC and further simultaneously incorporates matrices from MFD, namely DPM and MIM. Since the disclosed algorithm involves stochastic behavior, the output typically differs from one run to another. In a complex problem, it may be necessary to run the algorithm hundreds or even thousands of times to be reasonably sure a good global solution has been found. However, currently available hardware makes repeating the search ten thousand times feasible in a practical sense.

R-IGTA incorporates Reangularity, which allows the algorithm to assign a "metric of goodness" to the solution generated, with respect to the DPM/MIM. Reangularity measures the orthogonality between the design parameters, which corresponds to technical solutions in MFD. The original formula is applied to clusters by translating the similarity scoring of individual technical solutions to an equivalent scoring on a cluster level (using the equations in Table 5). Table 2 summarizes the equations of IGTA (Equations 1-6) and of Reangularity (Equations 7-8).

Five concepts are discussed below with respect to an exemplary R-IGTA algorithm: how clusters are represented; ClusterBid; TotalCost; the algorithm Core; and Reangularity.

First, IGTA features multiple cluster associations for single elements. One element may belong to two or more clusters. IGTA uses a matrix called ClusterMatrix to keep track of the association between elements and clusters. Each row corresponds to a cluster, and each column to an element. If element k belongs to cluster j, then ClusterMatrix$_{jk}$ is set to one, otherwise zero. The number of Clusters is designated $N_{clusters}$. A one-dimensional matrix called ClusterSize counts the number of Elements of each Cluster. FIG. 2 shows the internal representation of clusters using DSM, ClusterMatrix and ClusterSize.

Second, the concept of ClusterBid (Equation 6) is based on the total interaction between the component and the cluster. Total interaction, termed inout (Equation 4), is the sum of all dependencies between the component and the cluster. The size of the cluster, ClusterSize (Equation 5), is taken into account to prevent the appearance of very large clusters. IGTA moves a selected component to the cluster with the highest ClusterBid.

Third, Equations 1-3 show the original IGTA-equations used to calculate TotalCost. Table 3 summarizes the parameters used in IGTA, IGTA-plus, and R-IGTA. The value of the exponents, powdep and powbid, are listed in Table 3. IGTA seeks to minimize TotalCost.

TABLE 3

Parameter summary: IGTA, IGTA-plus, and R-IGTA

| Parameter | IGTA | IGTA-plus | R-IGTA | Used for |
|---|---|---|---|---|
| pow_cc | 1.0 | 1.0 | 1.0-2.0 | TotalCost formula |
| pow_bid | 1.0 | 1.0 | 1.0-2.0 | ClusterBid formula |
| pow_dep | 4.0 | 4.0 | 3.5-4.5 | ClusterBid formula |
| rand_accept | 2*DSMSize | 2*DSMSize | 2*DSMSize | Stochastic behavior |
| rand_bid | 2*DSMSize | 2*DSMSize | 2*DSMSize | Stochastic behavior |
| times | 2 | — | — | Clustering loop control |
| stable_limit | 2 | — | — | Termination criterion |
| max_repeat | 10 | 2 | 2 | Termination criterion |
| sma | — | yes | yes | Suppress multicluster |
| itc | — | yes | yes | Termination criterion |
| useDPM | — | — | yes | Include DPM |
| f0 | — | — | 10 | Non-linear function |
| n | — | — | 2.25-3.3 | Non-linear function |
| alfa00 | — | — | 0.5 | Learning behavior |
| epsilon | — | — | 0.02 | Learning behavior |
| sigma | — | — | 4.0 | Learning behavior |

Fourth, the term Core refers to the part of IGTA responsible for moving the selected element and keeping track of best solution so far. Once the objective functions are evaluated, IGTA takes a decision and updates ClusterMatrix to reflect the move. The two objective functions constitute the interface between the part for modification and the part that is kept stable (the Core).

TABLE 2

Summary of equations, supporting theory

| No. | Equations, supporting theory |
|---|---|
| 1 | IntraClusterCost = $(DSM_{ik} + DSM_{ki}) \cdot (ClusterSize_j)^{powcc}$<br>i, k $\in$ Cluster$_j$ |
| 2 | ExtraClusterCost = $(DSM_{ik} + DSM_{ki}) \cdot DSMSize^{powcc}$<br>i, k $\notin$ Cluster$_j$ |
| 3 | TotalCost = $\Sigma$IntraClusterCost + $\Sigma$ExtraClusterCost |
| 4 | $inout = \sum_{i \in Cluster_j} (DSM_{i,elmt} + DSM_{elmt,i})$ |
| 5 | $ClusterSize_j = \sum_{k=1}^{DSMSize} ClusterMatrix_{jk}$ |
| 6 | $ClusterBid_j = \dfrac{inout^{powdep}}{(ClusterSize_j)^{powbid}}$ |
| 7 | $\overline{FR} = A \cdot \overline{DP}$ |
| 8 | $R = \prod\limits_{\substack{i=1\ldots n-1 \\ j=i+1\ldots n}} \left(1 - \dfrac{\left(\sum_{k=1}^{n} A_{ki} A_{kj}\right)^2}{\left(\sum_{k=1}^{n} A_{ki}^2\right)\left(\sum_{k=1}^{n} A_{kj}^2\right)}\right)^{1/2}$ |

Fifth, Reangularity provides a measure of independence between Design Parameters (DPs). Equation 7 uses the System Matrix A to establish a relation between DPs and Functional Requirements (FRs). Reangularity, defined as in Equation 8, is a metric that falls between zero (coupled design) and one (perfectly uncoupled design). Using an extension of Reangularity, R-IGTA modifies TotalCost to balance DSM and MFD.

Figure 3:
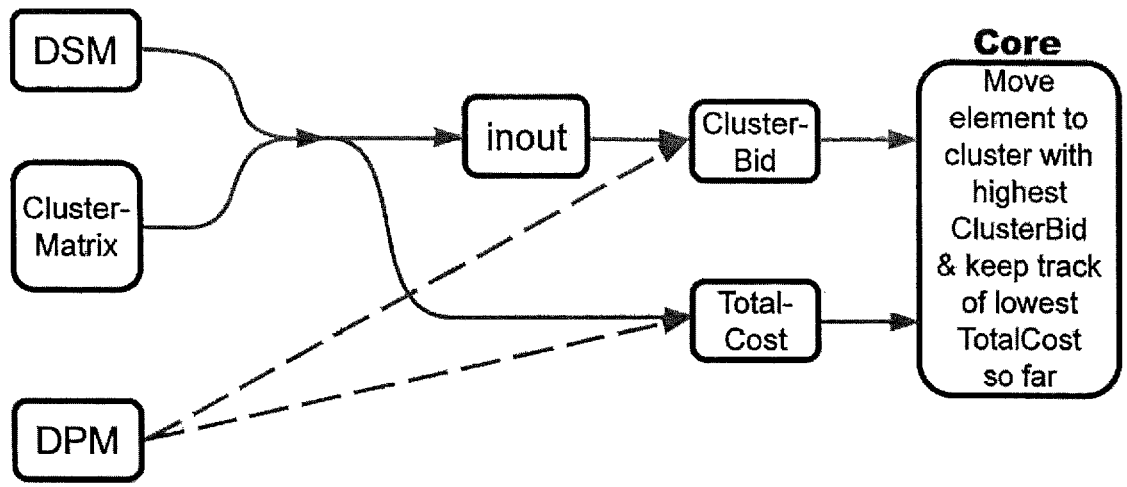
FIG. 3 is a schematic illustration of operation of an exemplary embodiment of the currently disclosed R-IGTA algorithm.

FIG. 3 is a schematic illustration of operation of an exemplary embodiment of the currently disclosed R-IGTA algorithm. The DPM is allowed to influence the objective functions but not the Core. Thus, the purpose of R-IGTA is to modify the objective functions from IGTA to accommodate the influence of the strategic similarity modularity drivers listed in DPM and/or MIM, without sacrificing the quality of the output. The mathematical core of R-IGTA may be condensed to three equations, shown in Table 4.

TABLE 4

Summary of equations, new objective functions

| No. | Equations, new objective functions |
|---|---|
| 9 | $\text{interaction} = \text{inout} + \dfrac{E(\text{inout})}{E(\text{scalar})} \cdot \text{scalar}$ |
| 10 | $\text{ClusterBid}_j = \dfrac{\text{interaction}^{powdep}}{(\text{ClusterSize}_j)^{powbid}}$ |
| 11 | $\text{TotalCost} = f(R) \cdot (\text{IntraClusterCost} + \text{ExtraClusterCost})$ |

The first term in Equation 9 is simply the interaction between pairs of components in the DSM, defined as in Equation 4. The second term is the contribution from MFD, calculated using pairwise scalar products between rows in the DPM or MIM. In an exemplary embodiment, the terms are roughly equal on average, or one matrix would consistently dominate. The ratio between the expected values of inout and scalar is used to normalize the second term. Equation 9 is written in this format so that it is a simple matter to ignore the second term in order to disregard the contribution from the domain mapping matrix (MFD, in this example).

This leads to the next set of equations, used to calculate the expected values of Equation 9. Table 5 summarizes the equations used by R-IGTA to make a prediction of the expected values of inout and scalar.

TABLE 5

Summary of equations for predicting inout and scalar

| No. | Equations, predicting inout and scalar | |
|---|---|---|
| 12 | $\lambda = \dfrac{1}{\text{DSMSize}^2} \sum_{j,k} \text{DSM}_{jk}$ | |
| 13 | $S_1 = \dfrac{1}{N_P \cdot \text{DSMSize}} \sum_{j,k} \text{DPM}_{jk}$ | |
| 14 | $S_2 = \sqrt{\dfrac{1}{N_P \cdot \text{DSMSize}} \sum_{j,k} \text{DPM}_{jk}^2}$ | |
| 15 | $E_k = N_P \cdot S_1 \cdot \left(S_2 - (S_2 - S_1) \cdot e^{\frac{k-1}{\sigma}}\right)$ | k = 1 ... DSMSize |
| 16 | $\alpha_k = \alpha_{00}$ | k = 1 ... DSMSize |

TABLE 5-continued

Summary of equations for predicting inout and scalar

| No. | Equations, predicting inout and scalar | |
|---|---|---|
| 12 | $\lambda = \dfrac{1}{\text{DSMSize}^2} \sum_{j,k} \text{DSM}_{jk}$ | |
| 17 | $E_k \leftarrow \alpha_k \cdot \text{scalar} + (1 - \alpha_k) \cdot E_k$ | k = ClusterSize$_j$ |
| 18 | $\alpha_k \leftarrow \alpha_k \cdot (1 - \epsilon)$ | k = ClusterSize$_j$ |
| 19 | $E(\text{inout}) = 2 \cdot \lambda \cdot \text{ClusterSize}_j$ | |
| 20 | $E(\text{scalar}) = E_k$ | k = ClusterSize$_j$ |

Equations 12-16 are concerned with the initial approximations. Equations 17-18 summarize the "learning" behavior of the algorithm: as real scalar values are calculated, the predicted values are updated to be more accurate in the next iteration. As more iterations are performed, increasing emphasis is placed on the second term of Equation 17. In an exemplary embodiment, learning is applied only to the scalar product.

Using the building blocks from Tables 4 and 5, Table 6 summarizes the equations used in R-IGTA.

TABLE 6

Summary of R-IGTA equations

| No. | Equations, R-IGTA |
|---|---|
| 21 | $\text{IO} = \text{ClusterMatrix} \times \text{DSM} \times \text{ClusterMatrix}^T$ |
| 22 | $\text{IntraClusterCost} = \sum_{k=1}^{n_{clusters}} \text{IO}_{kk} \cdot \text{ClusterSize}_k^{powcc}$ |
| 23 | $\text{ExtraClusterCost} = \left(\sum_{i=1}^{n_{clusters}} \sum_{j=1}^{n_{clusters}} \text{IO}_{ij} - \sum_{k=1}^{n_{clusters}} \text{IO}_{kk}\right) \cdot \text{DSMSize}^{powcc}$ |
| 24 | $\text{DPM2}_{ij} = \text{DPM}_{ij}^2$ |
| 25 | $\text{Equiv}_{jk} = \left(\dfrac{1}{\text{ClusterSize}_j} \cdot \sum_{i=1}^{DSMSize} \text{ClusterMatrix}_{ji} \cdot \text{DPM2}_{ik}\right)^{1/2}$ |
| 26 | $S = \text{Equiv} \times \text{Equiv}^T$ |
| 27 | $R = \prod_{\substack{i=1...N_{clusters}-1 \\ j=i+1...N_{clusters}}} \left(1 - \dfrac{S_{ij}^2}{S_{ii} \cdot S_{jj}}\right)^{1/2}$ $S_{ii} \cdot S_{jj} \neq 0$ |
| 28 | $f(R) = 1 + (f_0 - 1) \cdot (1 - R)^n$ |
| 29 | $\text{scalar}_j = \sum_{k=1}^{N_P} \text{DPM}_{elmt,k} \cdot \text{Equiv}_{j,k}$ |

IGTA allows an element to belong to more than one cluster. This is referred to as multicluster allocation. Multicluster allocation occurs when two or more clusters return the same ClusterBid and this happens to be the highest value obtained from all clusters. R-IGTA includes a feature called Suppressing Multicluster Allocation (SMA). When SMA is enabled and the multicluster condition is detected, the selected element is randomly assigned to one of the clusters with the highest ClusterBid. With SMA enabled, Equations 1-2 may be replaced with Equations 21-23 to improve processing speed.

The matrix labeled DPM2 (Equation 24) is introduced to save computations. The squares of the elements are used repeatedly in the algorithm, so computing them once increases speed. Equation 25 is used to represent the scoring of a cluster of technical solutions (DPM/MIM terminology, equivalent to components) in the same way as a single technical solution, allowing scalar products to be calculated for pairs of clusters, not just individual technical solutions. This in turn makes it possible to define Reangularity (Equation 27) for a collection of clusters. Equation 26 defines a matrix designated S, which is used to save computations during the calculation of Reangularity (Equation 27). Reangularity (Equation 27) may be calculated efficiently using the intermediate result from Equation 26. Before Equation 27 is applied, R-IGTA removes empty rows/columns from S. This is equivalent to removing technical solutions with zero scoring in the DPM/MIM.

Module Indication Matrix (MIM) seems to have influenced the output sufficiently, which can often be ascertained by looking for technical solutions with strong scoring on module drivers such as Styling or Common Unit. If such influence on the generated solution is not evident, the relative impact of the DPM and MIM matrices may be increased by reducing the value of n in one or several small steps. If small adjustments to the n (such as down to 2.2) do not result in useful change in results, a user may review the scoring of the matrices themselves and specifically update the DPM/MIM with new information.

Figure 11:
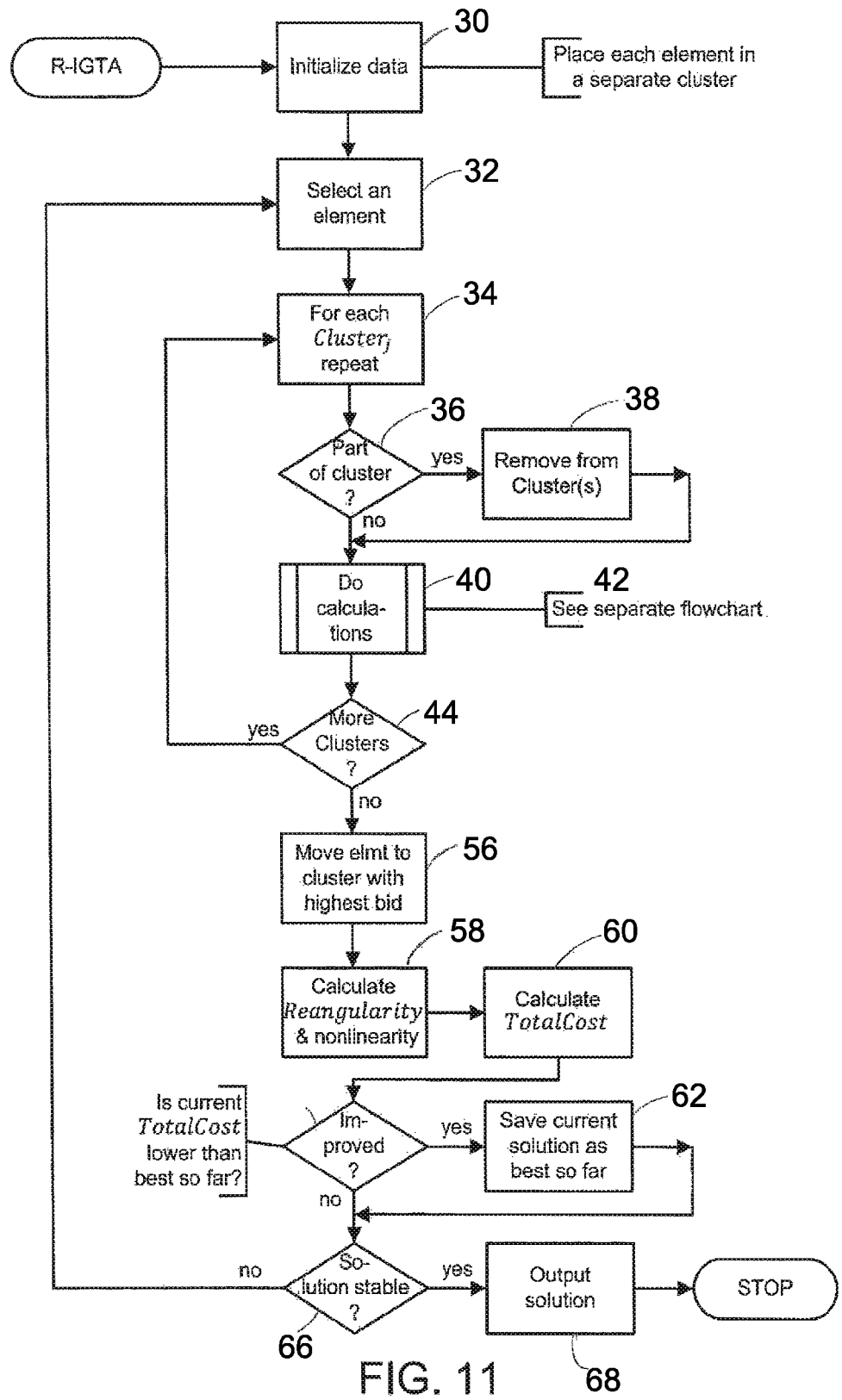
FIG. 11 is a high-level overview flowchart representation of R-IGTA.

FIG. 11 depicts a high-level flowchart representation of R-IGTA. Detailed flowcharts are provided FIGS. 12-22. Table 7 cross-references all the algorithm blocks, their respective flowchart representations, and equations. These flowcharts will be discussed in more detail with respect to a practical product application.

TABLE 7

Cross-reference table of formulas and equations

| Algorithm block | Purpose, short description | Flowchart | Equations |
| --- | --- | --- | --- |
| RIGTA_run | Initialize, invoke clustering, present results | 1 | 12, 24 |
| RIGTA_ink_Clusterparam | Set clustering parameters | — | |
| RIGTA_init_Learning | Initialize learning parameters | — | 13, 14, 15, 16 |
| RIGTA_Cluster | Perform R-IGTA clustering procedure | 1 | |
| RIGTA_Coord_Cost | Calculate TotalCost | 2 | 11 |
| RIGTA_initialize_list | Initialize list of elements not yet tried | 1 | |
| RIGTA_pick_elmt | Pick element, remove from list | 1 | |
| RIGTA_Process_bids | Collect bids, evaluate, move element | 3 | |
| RIGTA_equiv | Calculate equivalent scoring pattern | 2 | 5, 25 |
| RIGTA_reangularity | Calculate Reangularity of solution | 2 | 26, 27 |
| RIGTA_nonlinear | Apply nonlinearity to Reangularity | — | 28 |
| RIGTA_Total_Cost_sma | Calculate TotalCost using SMA | — | 21, 22, 23 |
| RIGTA_Total_Cost_igta | Calculate TotalCost using IGTA | — | 1, 2, 3 |
| RIGTA_bid | Calculate ClusterBids | 3 | 4, 6, 9, 10, 19, 20 |
| RIGTA_scalar | Calculate scalar products | 3 | 29 |
| RIGTA_update_Learning | Update expected scalar based on actual | — | 17, 18 |

Figure 4:
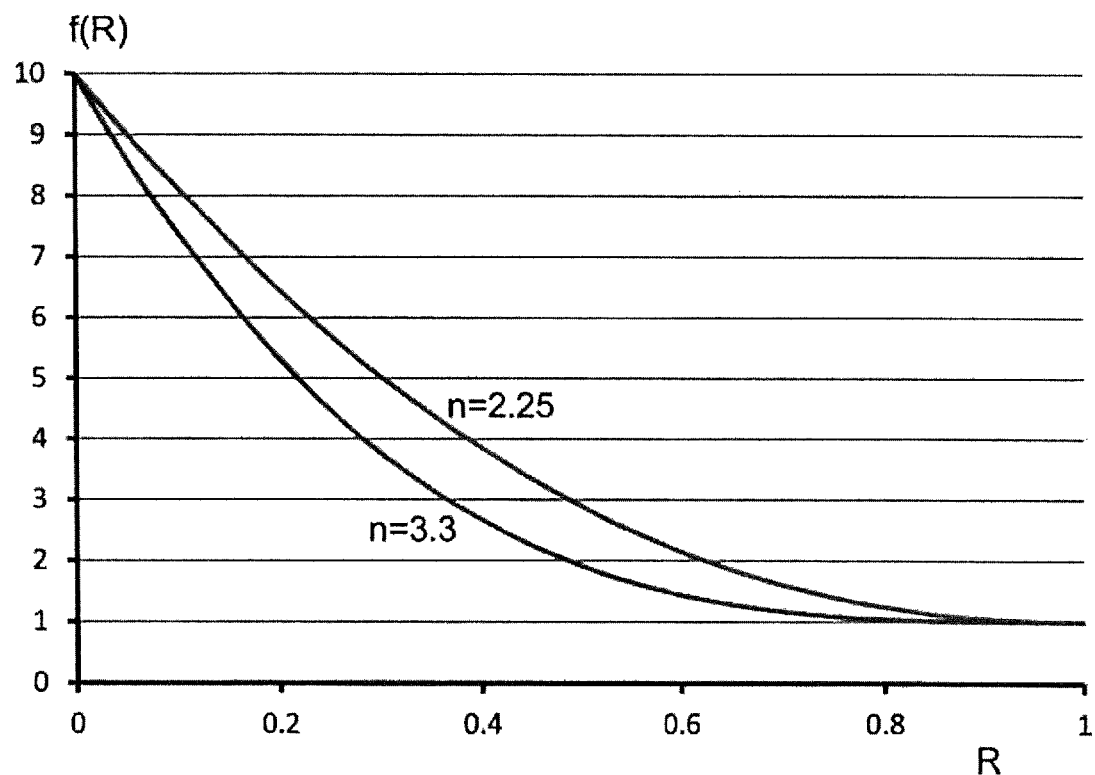
FIG. 4 is a graph illustrating the diminishing function of R defined in Equation 28.

An exemplary clustering solution has a low TotalCost and a high Reangularity. The ratio between TotalCost and Reangularity is a useful global optimization criterion if Reangularity is not zero. However, a Reangularity value of zero is quite likely to occur in the beginning of the execution of the algorithm. To prevent division by zero, a diminishing function of R is defined, somewhat shaped like 1/R, but which does not tend toward infinity as its argument approaches zero. Equation 28 defines a nonlinear decreasing function of Reangularity, the shape of which depends on two parameters. Using $f_0=10$ and two different values of n, the function is illustrated in FIG. 4. The value of n can be used as a tuning parameter to adjust the relative contribution of the DSM and MFD in module formation.

The scalar product (Equation 29) is calculated as the product between row number elmt in the DPM/MIM, and the Equivalent scoring pattern of each Cluster, using Equation 25. Element number elmt is selected randomly in each iteration. Before Equation 29 is calculated, the Equivalent scoring pattern is re-calculated using Equation 25, using all zeroes in column number elmt of ClusterMatrix, to prevent a selected technical solution from interacting with itself during the calculation of scalar product.

The value of n reflects the balance between the DPM/MIM and the DSM, and is thus an important tuning parameter. At the outset, an initial value of 3.3 is proposed for n. After the algorithm has been executed and the output examined, a qualitative determination is made whether the Evaluations show that the disclosed R-IGTA algorithm produces results as designed, i.e., it suggests modules that balance the similarity and coupling type drivers for modularity. Moreover, the disclosed R-IGTA algorithm converges on an acceptable solution in a reasonable number of iterations.

R-IGTA is a stochastic algorithm, so it is relevant to look at the distribution of TotalCost. The algorithm balances coupling and similarity, so it is desirable to have an indication of balance in the solution. By balancing coupling and similarity, the algorithm generates a solution that is different from pure MFD or pure DSM; it is desirable to see just how different the R-IGTA solution is, including the usefulness of that solution. Moreover, because the behavior of R-IGTA depends on several tuning parameters, it is useful to gauge the sensitivity of the solution with respect to changes in these tuning parameters.

FIG. 5 shows the two input matrices used in an illustrative artificial example. A Domain Mapping Matrix (DMM) is shown on the left. The domain mapping matrix has the same number of rows as the DSM matrix on the right. However, the DMM may have any number of columns. In the illustrated embodiment, the DMM corresponds to a DPM, such as that discussed with respect to FIG. 1. Thus, in the illustrated example, the DMM has seven columns corresponding to seven product properties and eight columns corresponding to eight product components, also referred as technical solutions. The matrix entries are quantitative indications of relations between the component and the product property; in other words, the entry indicates how much a component change impacts the performance of a particular product property. In the illustrated example, an entry of "1" indicates a weak relation; "3" indicates a medium relation, and "9" indicates a strong relation. Of course, other scales may be used.

A DSM matrix is shown on the right side of FIG. 5. Note that the DSM portion shows the same eight-node network as in FIG. 2. The DSM matrix shares the components (rows) of the DMM. Moreover, the DSM is a square matrix that has the same components as the column headings. Thus, the DSM is a matrix representation of the interaction of two components. Because a component does not interact with itself, the diagonal is shaded, as no entries will be provided in those boxes. The matrix entries quantify the strength of the interaction of two components. A blank box indicates that the two components do not interact. A "1" indicates that there is an interaction between the two components. A "2" indicates a strong interaction between the two components.

Figure 6:
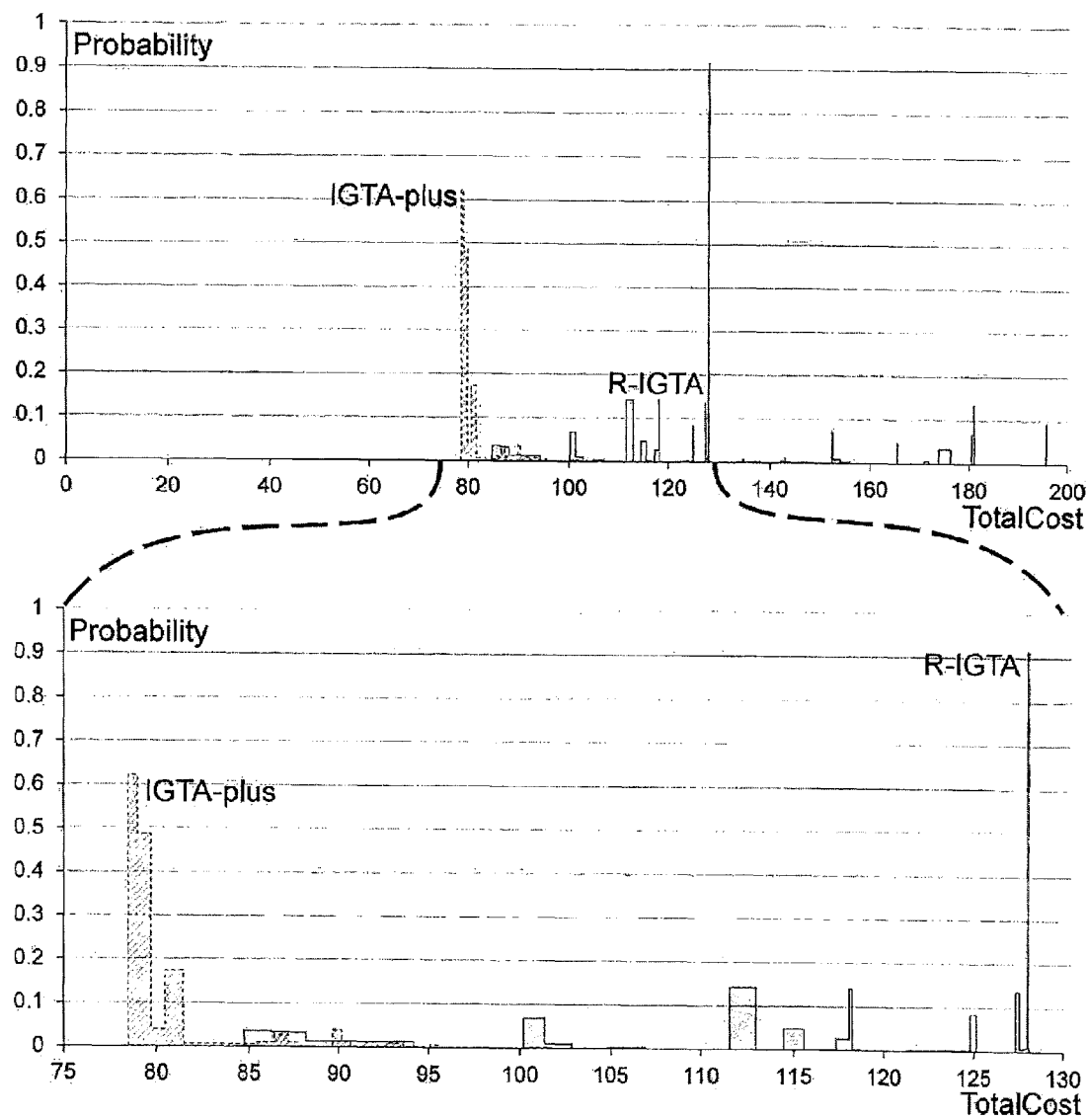
FIG. 6 is a graph showing distribution of TotalCost in IGTA-plus and R-IGTA.

Although IGTA-plus and R-IGTA are designed to solve different problems, it is useful to compare the distribution of the solutions generated by the two algorithms. Such a comparison allows assessment of the computational price exacted for attempting to solve the more general problem. The graphic in FIG. 6 shows the distribution of TotalCost for IGTA-plus and R-IGTA. The area of each rectangle is proportional to the probability that TotalCost falls in the range indicated by the width.

The R-IGTA solutions are much more spread out. Because a much lower ratio of the solutions generated by R-IGTA are close to the best value, a larger number of iterations are recommended to ensure output of a satisfactory solution. To compare the two outputs, we may determine (arbitrarily) that any solution beyond 5% of the best possible is deemed unacceptable. Table 8 summarizes some key statistics that allow us to compare R-IGTA to IGTA-plus.

TABLE 8

Statistics for performance of IGTA and R-IGTA.

|  | IGTA-plus | R-IGTA | Ratio |
|---|---|---|---|
| best TotalCost | 78.50 | 84.68 | — |
| average TotalCost | 80.70 | 125.40 | — |
| stddev | 4.03 | 46.51 | 0.087 |
| results within 5% | 89.1% | 19.7% | 4.527 |
| stddev/average | 0.0499 | 0.371 | 0.135 |
| average/best | 1.028 | 1.481 | — |

The relative spread measured as stddev/average is Q=1/0.135=7.4 times higher for R-IGTA than for IGTA-plus. The share of results within 5% of the best possible is 4.5 times better for IGTA-plus. Thus, on average, one should expect to use about five to seven times as many iterations for R-IGTA as IGTA-plus to converge on a very satisfactory solution.

In the previous section, IGTA-plus and R-IGTA were compared on one single dimension, the distribution of TotalCost. This section describes a two-dimensional comparison to show that the output of R-IGTA is actually better than what the one-dimensional comparison seems to suggest. The two-dimensional comparison considers Reangularity and IntraClusterCost+ExtraClusterCost separately.

Figure 7:
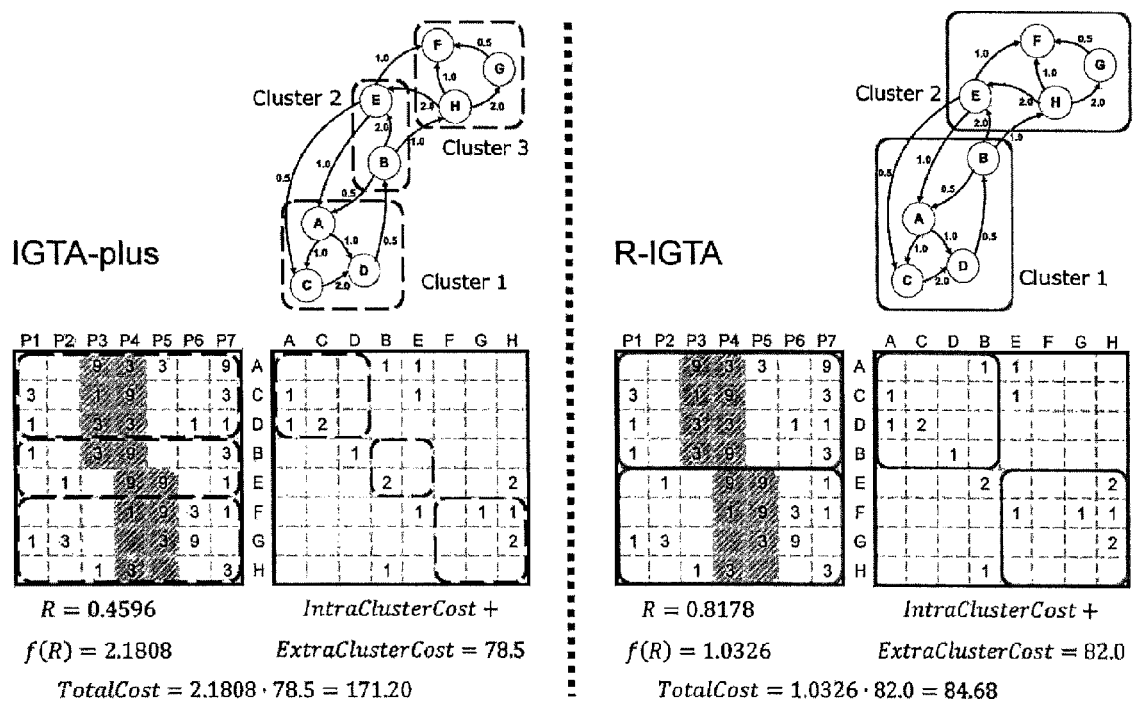
FIG. 7 is a schematic diagram showing a comparison of IGTA-plus and R-IGTA solutions in an artificial example.

FIG. 7 is a schematic diagram showing the solutions generated by IGTA-plus (left) and R-IGTA (right), plus the sorted DPM and DSM. IGTA-plus finds a solution with IntraClusterCost+ExtraClusterCost equal to 78.5 (highlighted). Examination of the solution generated by R-IGTA indicates that the value of IntraClusterCost+ExtraClusterCost comes in slightly higher at 82 with a Reangularity of 0.8178 (the ideal is unity). Using a non-linear function (with n=3.3) the Reangularity-value is converted into a multiplicative "punishment" or penalty of 1.0326, which gives a TotalCost of 84.68 (highlighted) for R-IGTA.

Figure 8:
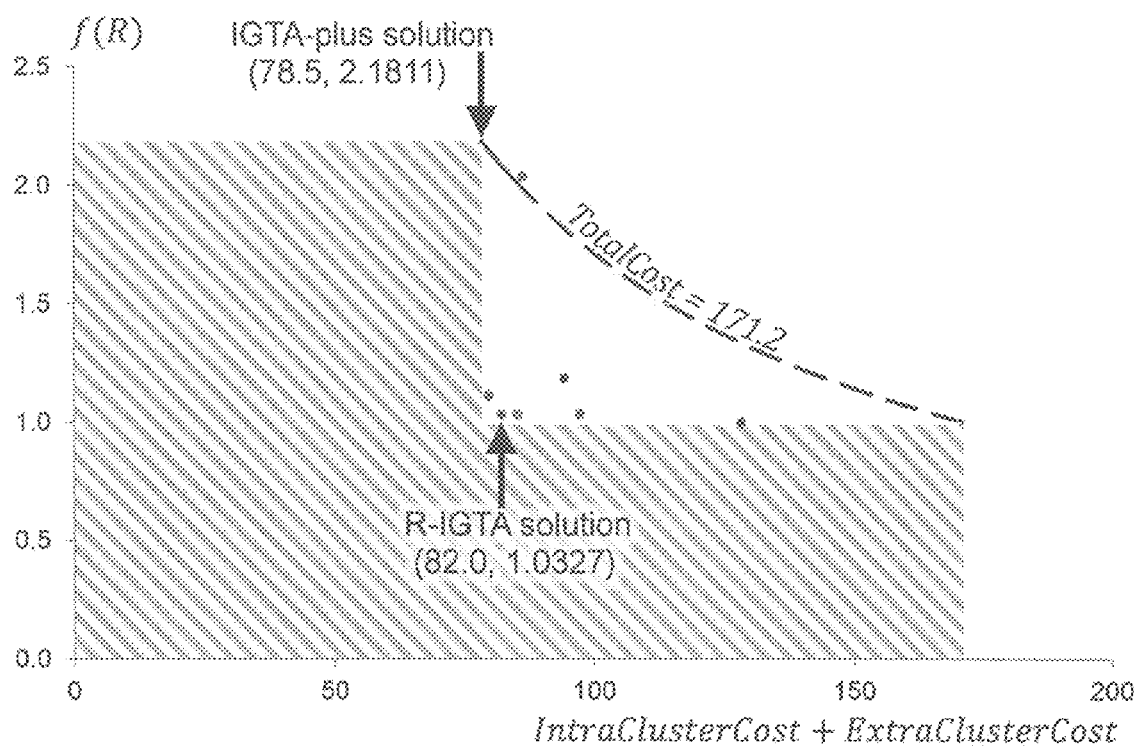
FIG. 8 is a scatterplot of R-IGTA solutions in an artificial example.

The graphic in FIG. 8 shows the two-dimensional distribution of the output of R-IGTA and compares it with the IGTA-plus solution. The dots are shaded by how frequently they occur in a trial of 10000 runs. For a small horizontal sacrifice, R-IGTA has found a solution with a significantly better Reangularity. FIG. 8 includes a superimposed iso-TotalCost curve. Solutions with a TotalCost lower than 171.2 are under the curve. The "triangle" is the acceptable solution-space. The left boundary is dictated by the best IGTA-plus solution and the lower boundary by the fact that Reangularity is always between zero and one, which means $f(R) \geq 1$.

The IGTA-plus solution for the composite optimization problem yields a TotalCost of 171.2 (calculated as 78.5 times 2.1811). However, the R-IGTA solution is much better, with a TotalCost of 84.68, very close to the lower left hand corner of the acceptable solution-space. A total of 84% of the generated solutions fall within that space.

To determine why the Reangularity of the IGTA-plus solution is so poor, we can look to the illustration on the left hand side of FIG. 7. The scoring of the properties called P3, P4, and P5 is highlighted. The first four lines form a rectangle of heavy scoring on properties P3 and P4, and the last four lines form a rectangle on properties P4 and P5. In the IGTA-plus solution, those two rectangles are broken up, whereas in the R-IGTA solution, they respect the cluster boundaries. Mathematically, this implies the IGTA-plus solution gets a significant contribution to the scalar product from properties P3, P4, and P5 of the second cluster, which reduces Reangularity. On the right hand side (R-IGTA), the patterns are more orthogonal, which yields a higher Reangularity.

Figure 9:
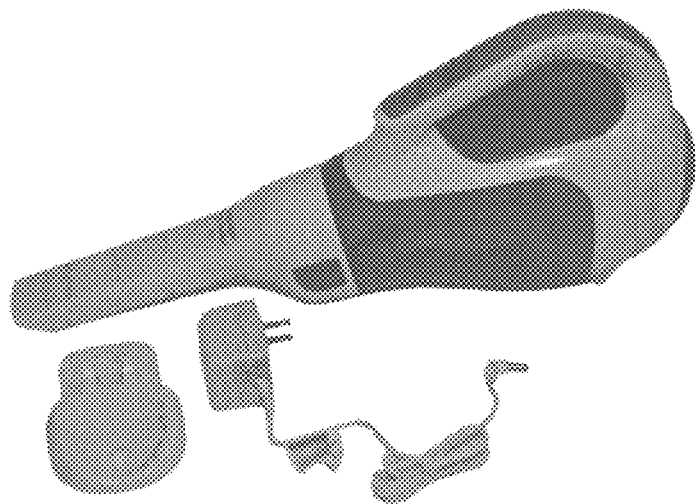
FIG. 9 is a perspective view of a product to which the disclosed R-IGTA algorithm is applied; in this case, the Dustbuster CHV1210 hand-held vacuum cleaner commercially available from Black & Decker.
Figure 10:
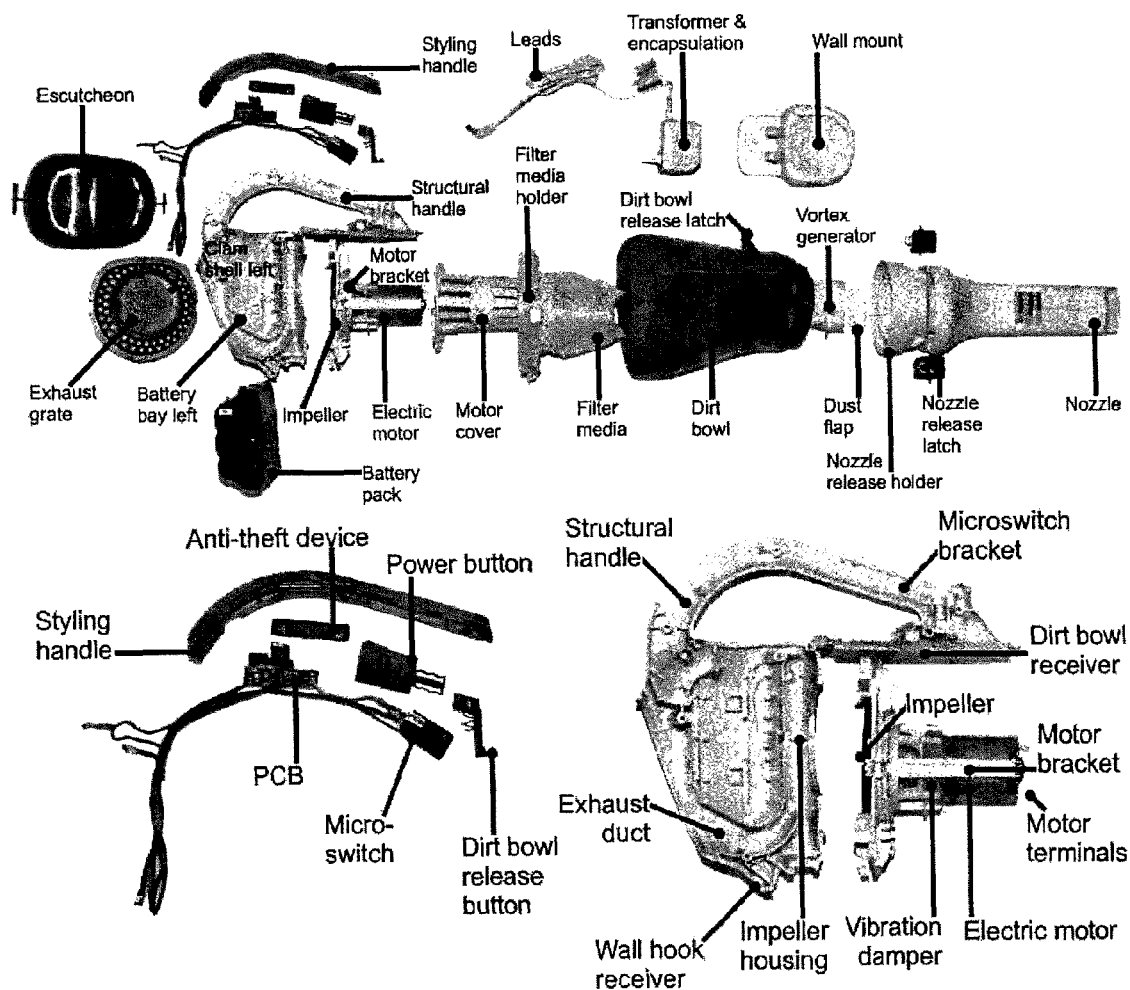
FIG. 10 is an exploded perspective view of the product of FIG. 9.

A case study illustrating a practical application of the disclosed R-IGTA algorithm follows. FIG. 9 is a perspective view of a product to which the disclosed R-IGTA algorithm is applied; in this case, the Dustbuster CHV1210 hand-held vacuum cleaner commercially available from Black & Decker. Taken apart, the unit consists of 57 Technical Solutions, also known as Components, 35 of which are shown in FIG. 10.

Table 9 sets forth the complete list of all technical solutions used in this analysis.

TABLE 9

Dustbuster Technical Solutions

Anti-theft device
Battery bay left

TABLE 9-continued

Dustbuster Technical Solutions

Battery bay right
Battery cell blank
Battery cell rechargeable
Battery pack terminals
Button cam device
Button cam receiver
Clam shell left
Clam shell right
Dirt bowl
Dirt bowl receiver
Dirt bowl release button
Dirt bowl release latch
Dirt bowl release spring
Dust flap
Electric motor
Encapsulation
Escutcheon
Exhaust duct
Exhaust grate
Filter media
Filter media holder
Grooves
Impeller
Impeller housing
Leads
Light Emitting Diode
LV AC connector female
LV AC connector male
Microswitch
Microswitch bracket
Motor bracket
Motor cover
Motor shaft
Motor terminals
Nozzle
Nozzle air duct
Nozzle release holder
Nozzle release latch
Nozzle rel. latch rec.
Nozzle release spring
Power button
Power plugs
Printed Circuit Board
Rectifier diode
Resistor
Shrink wrap
Structural handle
Styling handle
Transformer
Transistor
Vibration damper
Vortex generator
Wall hook
Wall hook receiver
Wall mount The product properties and interaction types are summarized in Table 10.

TABLE 10

Product properties (MFD) and interaction types (DSM)

Product Properties

Pressure drop
Impact resistance (J)
Dirt pickup capacity
Battery charge (mAh)
Unit weight
Force to release
Transparency of bowl
Dirt bowl volume
Nozzle width
Nozzle height
Force to slide button

TABLE 10-continued

Product properties (MFD) and interaction types (DSM)

Noise level
Length of cable
Force to insert
Vibration damping
Centrifugal action
Battery voltage
Mains voltage
Charge current (mA)
Battery protection
Indicate charge in progress
Particle size
Water resistance

| Code | Relation |
|------|----------|
| A | Attachment |
| D | Dust |
| E | HVAC |
| E | LVAC |
| E | LVDC |
| F | Force |
| H | Heat |
| L | Air flow |
| Q | Torque |
| S | Spatial |

Because the case study is based on an existing product, information on exactly how the components go together is available. Thus, the corresponding DSM contains a significant amount of information about the structure of the product. With the DPM, it is quite different. By observing, analyzing, and sometimes speculating, the method attempts to re-create the properties that are pertinent to the design of the product, as summarized in Table 10. Consequently, the DSM contains more information than the DPM. R-IGTA therefore tends to place more emphasis on the DSM. To offset this somewhat, increasing the emphasis on the DPM is accomplished by decreasing n to a value of 2.25, which corresponds to the upper curve in FIG. 4.

Figure 23:
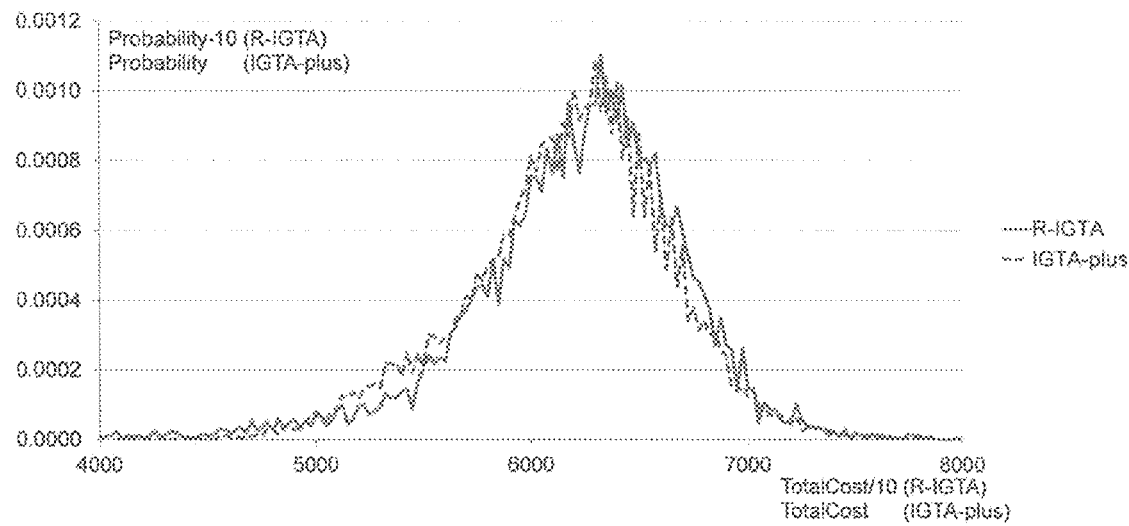
FIG. 23 is a graph showing distribution of TotalCost, wherein R-IGTA has been normalized.

The curves in FIG. 23 show the distribution of TotalCost for R-IGTA (n=3.3) and IGTA-plus. Since R-IGTA includes a multiplier, f(R), which tops out 10, the R-IGTA values have been divided by 10. The vertical scale has been normalized to maintain an area of exactly one under the curves.

Figure 24:
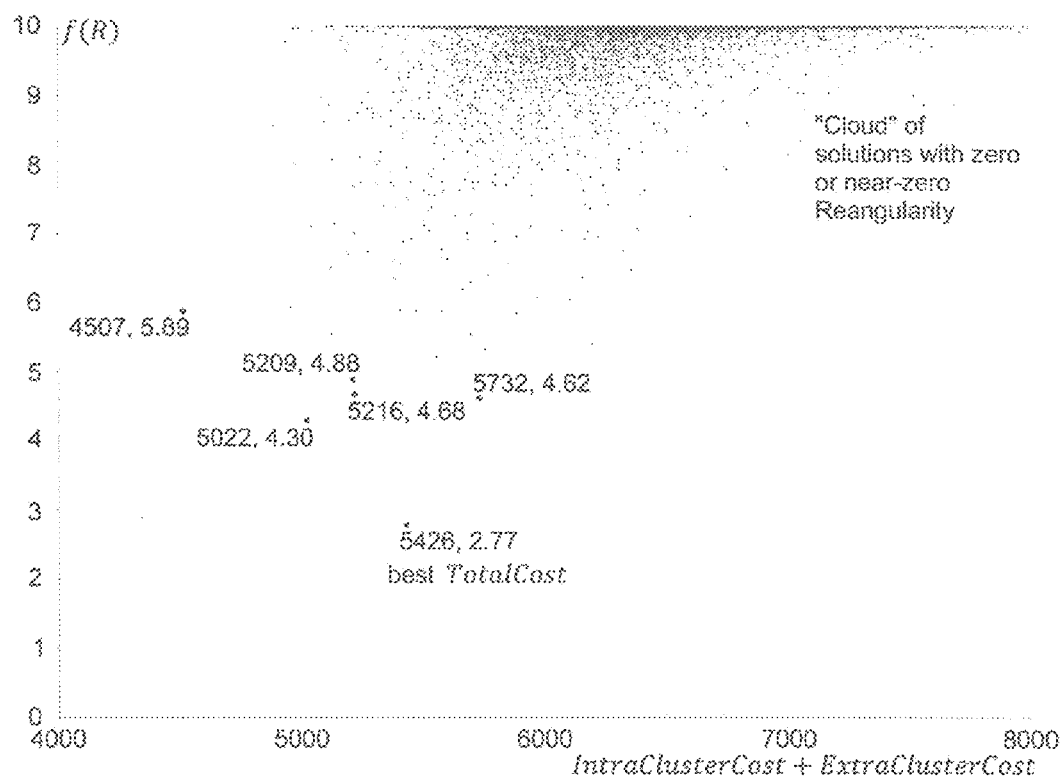
FIG. 24 is a scatterplot of R-IGTA solutions, wherein n=3.3.

The best R-IGTA solution is outside the scale, but would have shown up as a tiny "bump" at TotalCost/10=1505. The best solution has IntraClusterCost+ExtraClusterCost=5426.2 and f(R)=2.7736 for a TotalCost=15050. The reason the R-IGTA distribution is shifted by a factor of ten is related to the non-linear function used to translate Reangularity, see FIG. 4. FIG. 24 shows a scatter plot of R-IGTA solutions. The solutions with extremely poor Reangularity have f(R)≈10 meaning they are shifted by a factor of ten, compared to an algorithm that considers only the horizontal axis (e.g., IGTA-plus).

Table 11 shows all the elements, as they were clustered by the two algorithms.

TABLE 11

Comparison of solutions generated by R-IGTA and IGTA-plus.

| R-IGTA | TS | IGTA-plus | R-IGTA | TS | IGTA-plus |
|---|---|---|---|---|---|
| 9 | Wall hook | 14 | 4 | Vibration damper | 5 |
| 9 | Wall mount | 14 | 4 | Motor terminals | 5 |
| 9 | Wall hook receiver | 1 | 4 | Electric motor | 5 |
| 1 | Clam shell left | 1 | 4 | Motor shaft | 5 |
| 1 | Clam shell right | 1 | 5 | Microswitch bracket | 8 |
| 1 | Dirt bowl receiver | 1 | 5 | Structural handle | 8 |
| 1 | Escutcheon | 1 | 5 | Microswitch | 8 |
| 1 | Motor bracket | 1 | 5 | Dirt bowl release spring | 13 |
| 1 | Exhaust duct | 1 | 7 | Dirt bowl release button | 13 |
| 1 | Exhaust grate | 1 | 7 | Anti-theft device | 7 |
| 1 | Impeller housing | 1 | 7 | Styling handle | 7 |
| 1 | Impeller | 1 | 7 | Power button | 7 |
| 1 | Battery bay left | 12 | 6 | Battery cell blank | 4 |
| 1 | Battery bay right | 12 | 6 | Battery pack terminals | 4 |
| 2 | Nozzle release spring | 2 | 6 | Shrink wrap | 4 |
| 2 | Nozzle release latch | 2 | 6 | Battery cell rechargeable | 4 |
| 2 | Nozzle | 2 | 8 | Filter media | 6 |
| 2 | Vortex generator | 2 | 8 | Filter media holder | 6 |
| 2 | Nozzle air duct | 2 | 8 | Motor cover | 6 |
| 2 | Dust flap | 2 | 10 | Transformer | 10 |
| 2 | Nozzle release holder | 2 | 10 | Power plugs | 10 |
| 2 | Nozzle release latch receiver | 9 | 10 | Encapsulation | 10 |
| 2 | Dirt bowl release latch | 9 | 11 | Button cam receiver | 11 |
| 2 | Dirt bowl | 9 | 11 | Button cam device | 11 |
| 3 | Light Emitting Diode | 3 | 12 | Leads | 15 |
| 3 | Rectifier diode | 3 | 12 | Grooves | 15 |
| 3 | Resistor | 3 | | | |
| 3 | Transistor | 3 | | | |
| 3 | Printed Circuit Board | 3 | | | |
| 3 | Low voltage AC connector male | 16 | | | |
| 3 | Low voltage AC connector female | 16 | | | |

The two sets of shaded technical solutions in are the ones that "straddle" a module boundary, e.g., the two algorithms are making different predictions as to whether the technical solutions belong in the same module or different modules. In total, four technical solutions straddle module boundaries.

Dirt bowl release spring is connected to Dirt bowl release button, which is what drives IGTA-plus to place them in the same cluster. However, the Dirt bowl release spring is associated with Force to release, whereas the Dirt bowl release button is heavy on Styling, which pulls them apart. In fact, the Dirt bowl release button ends up with a couple of other Styling elements: the Styling handle and the Power button. The anti-theft device is devoid of scoring in the DPM, but ends up in the same module because it is known to attach to the Styling handle.

The male and female parts of the Low voltage AC connector are together in either clustering output. Neither DPM nor DSM has information to indicate they have to come apart for geometrical reasons. If it is desired to force them apart, that may be accomplished by adding two properties, one for each geometrical region, and tagging each technical solution by where it most likely belongs.

IGTA-plus and R-IGTA generate solutions that are different, as shown in Table 12.

TABLE 12

Comparison of the solutions generated by Hierarchical Clustering and R-IGTA

| Cent. Pearson | TS | R-IGTA | Cent. Pearson | TS | R-IGTA |
|---|---|---|---|---|---|
| 2 | Motor bracket | 1 | 10 | Filter media | 8 |
| 2 | Battery bay left | 1 | 10 | Motor cover | 8 |
| 2 | Battery bay right | 1 | 6 | Wall hook | 9 |
| 7 | Clam shell left | 1 | 6 | Wall mount | 9 |
| 7 | Clam shell right | 1 | 6 | Wall hook receiver | 9 |
| 10 | Exhaust duct | 1 | 2 | Power plugs | 10 |
| 10 | Exhaust grate | 1 | 2 | Encapsulation | 10 |
| 10 | Impeller housing | 1 | 5 | Escutcheon | 1 |
| 10 | Impeller | 1 | 13 | Dirt bowl receiver | 1 |
| 2 | Nozzle release spring | 2 | 12 | Nozzle release holder | 2 |
| 2 | Nozzle release latch receiver | 2 | 2 | Rectifier diode | 3 |
| 2 | Dirt bowl release latch | 2 | 11 | Resistor | 3 |
| 5 | Nozzle release latch | 2 | 6 | Electric motor | 4 |
| 5 | Dirt bowl | 2 | 8 | Vibration damper | 4 |
| 10 | Nozzle | 2 | 7 | Structural handle | 5 |
| 10 | Vortex generator | 2 | 16 | Microswitch | 5 |
| 10 | Nozzle air duct | 2 | 2 | Battery pack terminals | 6 |
| 10 | Dust flap | 2 | 6 | Battery cell rechargeable | 6 |
| 3 | Low voltage AC connector male | 3 | 9 | Battery cell blank | 6 |
| 3 | Low voltage AC connector female | 3 | 14 | Shrink wrap | 6 |
| 9 | Light Emitting Diode | 3 | 12 | Anti-theft device | 7 |
| 9 | Transistor | 3 | 15 | Filter media holder | 8 |
| 9 | Printed Circuit Board | 3 | 1 | Transformer | 10 |
| 2 | Motor terminals | 4 | 2 | Button cam receiver | 11 |
| 2 | Motor shaft | 4 | 16 | Button cam device | 11 |
| 2 | Microswitch bracket | 5 | 2 | Grooves | 12 |
| 2 | Dirt bowl release spring | 5 | 4 | Leads | 12 |
| 5 | Dirt bowl release button | 7 | | | |
| 5 | Styling handle | 7 | | | |
| 5 | Power button | 7 | | | |

On the left is a clustering generated using Hierarchical Clustering (using Centroid/Pearson), operating on the DPM/MIM. On the right is the R-IGTA solution. Cluster boundaries have been aligned, as far as possible. The twenty Technical Solutions shaded in gray are the ones that could not be allocated to a cluster with at least two elements that appear together in the output by both algorithms. As an example, four Technical Solutions belong to cluster number 6 in the R-IGTA output (Battery pack terminals, Battery cell rechargeable, Battery cell blank, and Shrink wrap) but each of those Technical Solutions appears in a different cluster in the Centroid/Pearson output (clusters 2, 6, 9, and 14). Another way to think of these Technical Solutions is they represent the greatest level of disagreement between the two algorithms.

The agreement is much lower. In this case study, R-IGTA is tilted in favor of DSM, meaning that the resulting solution seems closer to the DSM-based clustering arrangement than the DPM-based clustering arrangement. Although the solutions generated by IGTA-plus and R-IGTA are different, the R-IGTA solution is closer to the solution generated by IGTA-plus than it is to a solution generated by traditional Hierarchical Clustering (operating on DPM/MIM only).

Figure 25:
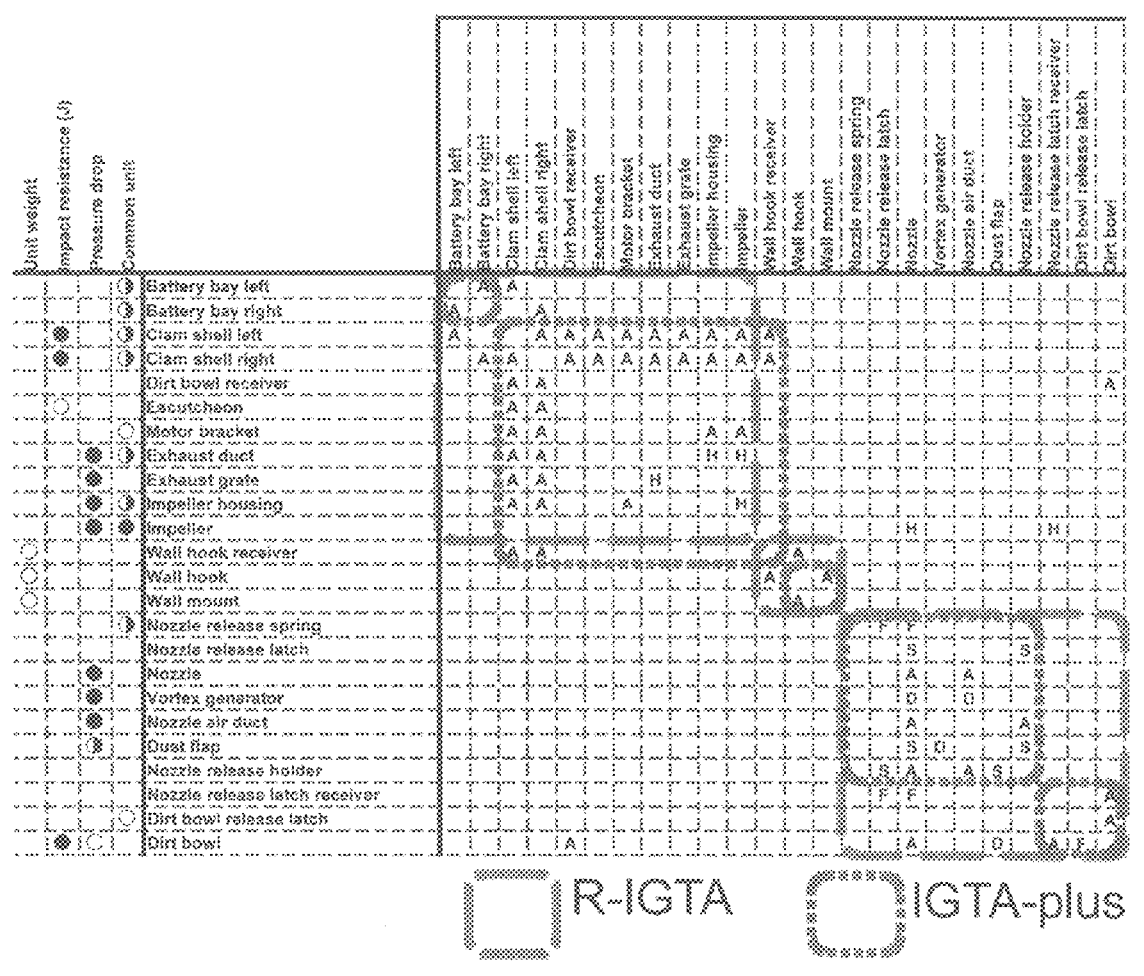

A comparison of the solutions obtained by IGTA-plus and R-IGTA yields that most of the interesting differences are in the first two or three clusters. FIG. 25 compares the key differences between the clusters generated by R-IGTA and IGTA-plus. For improved readability, only the first 24 of 57 Elements are shown. For the remaining 33 components, the two algorithms generate the same solution.

The first four columns on the left are the Properties and Module Drivers with significant (non-zero) scoring for the 24 Technical Solutions shown. In the first cluster, IGTA-plus separates the left and right halves of the battery bay, whereas R-IGTA keeps these elements with the other elements dominated by a Common Unit strategy. In the second R-IGTA cluster, the algorithms differ with regard to Wall hook receiver: R-IGTA keeps it in the cluster that scores on Unit weight, whereas IGTA-plus has that Element part of the previous Cluster. In the lower right hand corner, the Nozzle acts as a sort of system "bus," and various Elements connect to it. The Properties and Module Drivers shown on the left do not seem to be strong enough to "break" that structure. Although Pressure drop has strong scoring on seven Components, they are broken into two Clusters: The upper portion corresponds to Elements in the rear of the unit, and the lower portion to Elements located close to the Nozzle. Functionally, anything that scores on Pressure Drop is in the air path of the unit. In the absence of any other information, a hierarchical clustering would keep those Technical Solutions together, essentially forming an "air tunnel module." Both IGTA-plus and R-IGTA have so much additional information about the actual geometry of the product that both predict a structure where the front and the rear of the unit are clearly separated into two large clusters, the upper being the suction unit and the lower the nozzle.

R-IGTA proposes three modules and IGTA-plus five. For the complete case study, this relation holds: R-IGTA generates 12 modules and IGTA-plus 16. Whether one solution is more useful than the other is hard to say, but R-IGTA clearly prefers to keep Common Unit components together. IGTA-plus cannot take strategic considerations of that nature into account.

An assessment of the differences between the two algorithms starts with a focus on Technical Solutions where the strategic reason is the only reason for separation. This is unique to MFD, so although there may be other useful heuristics, this would be one of the simplest. Table 13 lists the six Technical Solutions where MIM-scoring represents either 99 or 100% of the total scoring weight in DPM/MIM.

TABLE 13

List of Technical Solutions with dominant strategic similarity reasons

| | |
|---|---|
| Nozzle release latch | Dirt bowl release button |
| Battery bay left | Battery bay right |
| Shrink wrap | Power button |

Thirteen runs of R-IGTA were performed and compared with traditional MFD-clustering (hierarchical clustering using, in this case, Centroid/Pearson) and traditional DSM (IGTA-plus). One single R-IGTA run has Resistor and Transistor together. Although the functional justifications for separating these two Technical Solutions are actually different, the DSM says they physically need to sit on the same PCB. In that light, the R-IGTA output of that particular run seems like a very appealing compromise.

Five of the R-IGTA runs separate the LED from the rest. The presence or absence of LED is actually a feature that Black & Decker uses to differentiate their models, so separating the LED makes sense, if it is possible to do so in practice.

Eleven of the runs predict Battery bay left and Battery bay right should form a module. The placement of the Battery bay dictates, to a large extent, the location of the weight center, which in turn has ergonomic implications. Since the DSM is based on the decomposition of an existing unit, the location of the battery bay is already reflected in the DSM. The MIM shows Battery bay as a medium-strong Common unit. Changes to Battery charge and Battery voltage is achieved by changing the composition of the Battery pack. The Shrink wrap and Battery cell blanks serve to guarantee a consistent shape of the Battery pack, enabling a Battery bay that is Common Unit. With the exception of Battery bay left/right, the R-IGTA output was mostly skewed toward the DSM. The LED got separated into its own module in roughly half of the runs, and the Battery bay in almost all the runs.

The example shows R-IGTA manages to strike a balance between TotalCost and Reangularity. The algorithm allows a slightly higher TotalCost to achieve a better Reangularity score. In the embodiment of the cordless hand vacuum, R-IGTA displayed a certain "preference" for the DSM, most likely caused by information asymmetry. Counting the number of non-zero elements, there was almost 50% more information provided in the DSM, than in the DPM/MIM. R-IGTA generates output which is different from that obtained by pure DSM, and it seems to take Module Drivers. The case study indicates the scoring of both Common Unit and Styling had an impact on the solutions obtained. This is attractive, since IGTA-plus lacks that ability.

R-IGTA may use useful under the following conditions: when module generation based on component coupling and similarity scoring seems appropriate with regard to the nature of the product; when clustering based on pure DPM or pure DSM yields poor results or is inconclusive; when a team desires to incorporate product strategy considerations into the generation of the conceptual architecture; when the key matrices (DPM/MIM/DSM) are available or can be compiled with reasonable effort; and/or when the amount of information in the DPM/MIM and DSM are roughly comparable.

R-IGTA solves a problem that has not been solved before, and R-IGTA offers an algorithmic solution to balancing the engineering view of the product (the way components have to connect for the product to work, e.g., the DSM) with the customer view (what properties needs to vary, e.g., the DPM) and the company view (what is the product strategy, e.g., the Module Drivers).

Compared to the Core of IGTA, the Core of R-IGTA modifies two formulas: ClusterBid and TotalCost. Several tuning parameters modify the behavior of the algorithm R-IGTA in terms of size of largest cluster, number of clusters, and composition of those clusters, for example. It may be possible to tailor the output of R-IGTA to suit a particular desired outcome.

FIG. 11 depicts a high-level flowchart representation of R-IGTA. Detailed flowcharts are provided in FIGS. 12-22. As produced above, Table 7 cross-references all the algorithm blocks, their respective flowchart representations, and equations. The following discussion applies the described algorithms in a practical method for driving the architectural development or redesign of a product. In an exemplary embodiment, the product is the handheld vacuum cleaner shown in FIGS. 9 and 10.

As in initial matter, a DMM and a DSM matrix, such as those shown in FIG. 5, are populated with data. For example, DMM matrix may have 57 rows corresponding to the 57 components listed in Table 9. The DMM matrix may have 31 columns corresponding to the 23 product properties listed in Table 10 plus 8 module drivers. An entry is made in each box of the DMM matrix to quantify a relation between how strongly a change to a particular component affects the performance of a particular product property. In an exemplary embodiment, the DMM will be referred to as a DPM.

The DSM matrix has the same 57 rows as the DMM matrix. Because the DSM matrix is a square matrix, it also has the same 57 components as column headings. An entry is made in each box of the DSM matrix to quantify the strength of interaction between any two components. An entry in each of the two input matrices represents results from a critical view of the components, their interactions, and their relation to product performance.

In an exemplary method, the R-IGTA algorithm is run on the populated matrices to yield optimized clusters or groups of components. These clusters then direct product engineering, as each cluster of components is treated as a subsystem in the product architecture. Referring to FIG. 11, the overview flowchart for an R-IGTA algorithm includes step 30 for initializing data. In this step, parameters and coefficients are set. Initial approximations using Equations 12-16 are made. Each component is initially set to be in its own cluster. Equation 24 is used to increase computational efficiency.

At step 32, in one embodiment, the algorithm selects a component randomly from the components of the matrices. At step 34, a clustering procedure loop begins. The loop steps through each of the existing clusters (j=1, 2, 3, . . . ). At step 36, a determination is made regarding whether the selected element is a part of the cluster j that is currently being processed. If yes, then the element is removed at step 38 so that it does not interact with itself (i.e., so that it is not double-counted). If no, then the algorithm moves to calculations at step 40.

Figure 12:
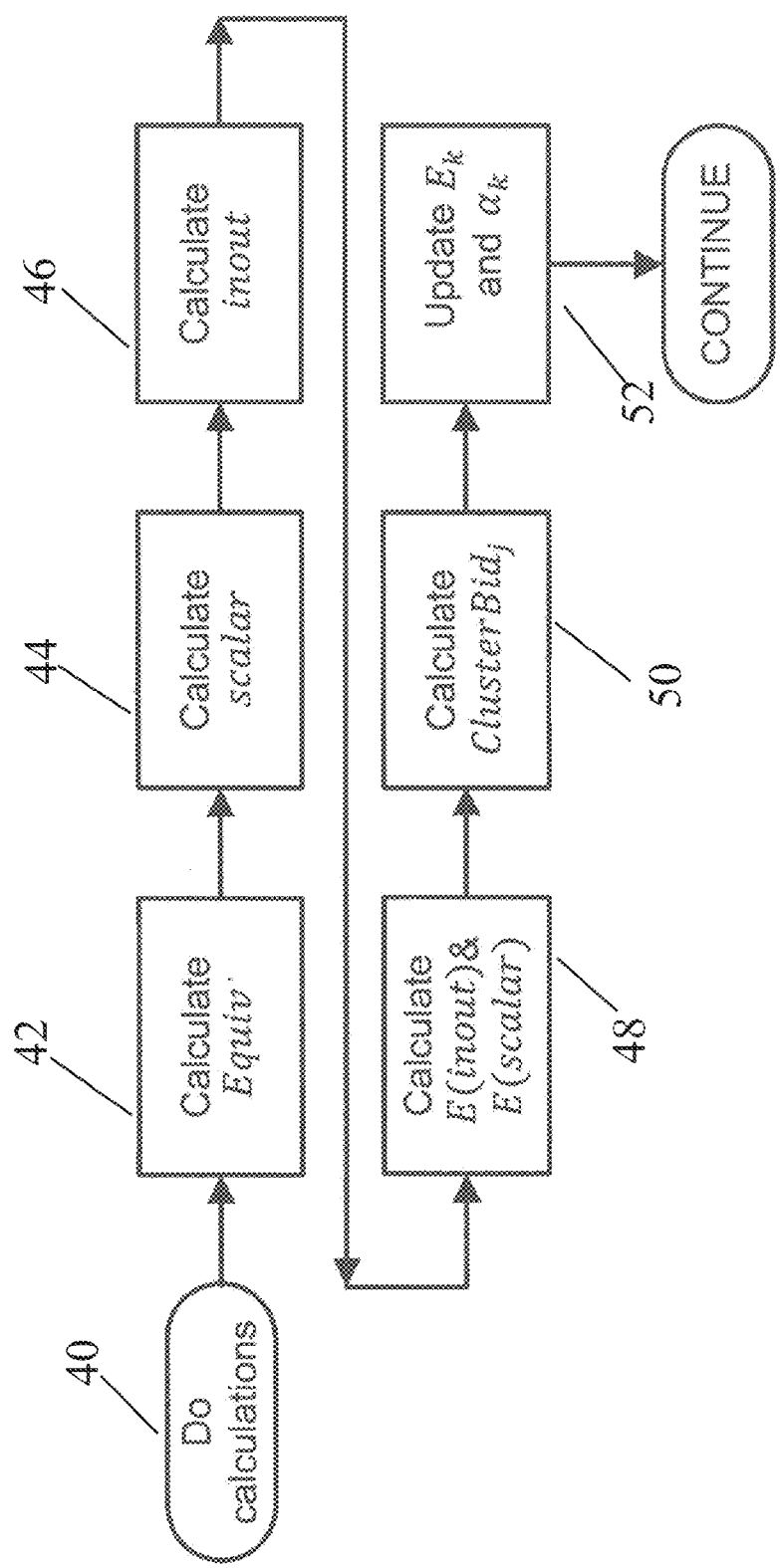
FIG. 12 is a detailed flowchart of the calculations in FIG. 11.

Step 40 is expanded to a calculations flowchart shown in FIG. 12. The calculations are represented as a linear sequence of steps. However, where a calculation is not dependent upon another calculation, it is to be understood that the sequence of calculations may be changed. At step 42, labeled "Calculate Equiv," Equation 25 is used for scoring the DPM in a way that allows the DPM matrix to be represented as a single component. In effect, this collapses all of the DPM matrix considerations into an equivalent component, which allows these considerations to be taken into account during clustering as if they were a single component. This feature is also important for calculating Reangularity. A flowchart showing an exemplary embodiment for calculating an equivalent scoring pattern is presented in FIG. 20. Settings in the flowchart of FIG. 20 prevent certain failures from occurring in the calculation (for example, preventing division by zero) so that the calculation may proceed without introducing unwanted errors.

In step 44, a scalar product is calculated using Equation 29. A flowchart showing an exemplary embodiment for calculating a scalar product is presented in FIG. 19.

In step 46, the term inout is calculated using Equation 4. Step 48 is performed using Equations 19 and 20. The expected values of inout and scalar are computed. The contributions of DSM and DPM are normalized to the same scale so that contributions from both matrices may be considered.

In step 50, ClusterBid is calculated using Equations 9 and 10. The algorithm is extended to operate on both the DPM (DMM) and DSM. The ClusterBid calculation result is an indication of the strength of an interaction between a cluster and a component, with an adjustment for cluster size to encourage smaller clusters.

In step 52, Equations 17 and 18 are used in a learning behavior to shift the focus of the algorithm from an individually calculated scalar to a predicted, or expected, scalar. This tuning arrangement shifts the behavior of the algorithm as it learns and becomes more informed with each iteration. The $\alpha_k$ coefficient of Equation 18 balances the previous prediction and the current scalar product. Sub-index k signifies that each value of alfa is specific to a cluster size, e.g., alfa sub 3 would be the balancing parameter for a cluster of 3 elements. The frequency of clusters of a specific size is very uneven. In other words, alfa in reality is a vector of values, with K going from one (the lowest value) to DSM-Size (the highest value).

In step 54 of FIG. 11, a determination is made regarding whether there are more clusters to be considered for the selected element. If yes, then the algorithm loops and repeats for the next cluster. If no, then the algorithm continues. In step 56, the element is moved to the cluster with the highest ClusterBid.

In step 58, a first objective fitness function referred to as Reangularity is calculated for the current clustering arrangement using Equations 26 and 27, taking into account nonlinearity, using Equation 28. Reangularity is a quality metric that indicates the usefulness of the clustering arrangement. Reangularity is primarily used for individual components rather than for clusters. Accordingly, to apply the scoring to the cluster, calculating Equiv according to Equation 25 collapses the scoring for a cluster into a single row, so that the cluster can be treated as a single component. A flowchart showing an exemplary embodiment for calculating Reangularity is presented in FIG. 22. Equation 26 is applied at step 210. Equation 27 is applied at step 212.

Also in step 58, nonlinearity is used according to Equation 28. Equation 28 defines a nonlinear decreasing function of Reangularity to prevent division by zero when considering the ratio of cost to Reangularity. The nonlinearity function replaces the Reangularity value with a non-zero value. Other non-linear monotonously decreasing functions are possible, as long as they have roughly the same shape as the disclosed non-linear function.

In step 60, a second objective fitness function referred to as TotalCost is calculated using Equation 11. Evaluating TotalCost for each clustering arrangement is a step toward finding the clustering arrangement with the lowest TotalCost.

In step 62, a determination is made regarding whether the current clustering arrangement is an improvement over the previous clustering arrangement (e.g., before the element was moved). The question to be answered is whether the TotalCost is the best so far? If yes, then in step 64, the current clustering arrangement is saved as the best so far. If no, then the current solution is not saved, and the previous clustering arrangement remains the best solution so far.

In step 66, a determination is made regarding whether the solution is stable. There are many ways for deciding when the solution is stable. In one embodiment, the solution is considered stable if it has not changed for a certain number of iterations. In another embodiment, the solution is considered stable after a set maximum number of iterations have been performed (e.g., a timeout condition).

With an improved termination criterion (ITC), in another embodiment, the solution is considered stable if all possible moves of elements between clusters have been exhausted. ITC uses a logic that keeps track of elements that have been tried so that they are not picked again. At any point in the calculation, e.g., for a certain allocation of elements to clusters, this means that the algorithm will not waste more iterations than there are elements in the input data. Use of the disclosed termination criterion may cut execution time by a factor or 4 or 5 and improves the quality of the output solution. An exemplary disclosed termination criterion keeps a list of elements that have not yet been tried. As elements are tried, they are removed from the list. When the list is empty, the algorithm terminates. If an element is moved to a different cluster, the list is reset so that all the elements may be tried with the new clustering arrangement. A flowchart showing an exemplary embodiment for initializing the list is presented in FIG. 13, wherein all components initially populate the list. Moreover, the list is reset every time there is a change in the clustering arrangement. A flowchart showing an exemplary embodiment for randomly picking an element from the list of untried elements is presented in FIG. 14. As an element is picked, it is deleted from the list. When the list is empty, the solution is considered stable and is output in step 68. Before that point, the algorithm returns to step 32 to pick the next element. A user can choose whether or not to implement ITC for a particular application.

Figure 15:
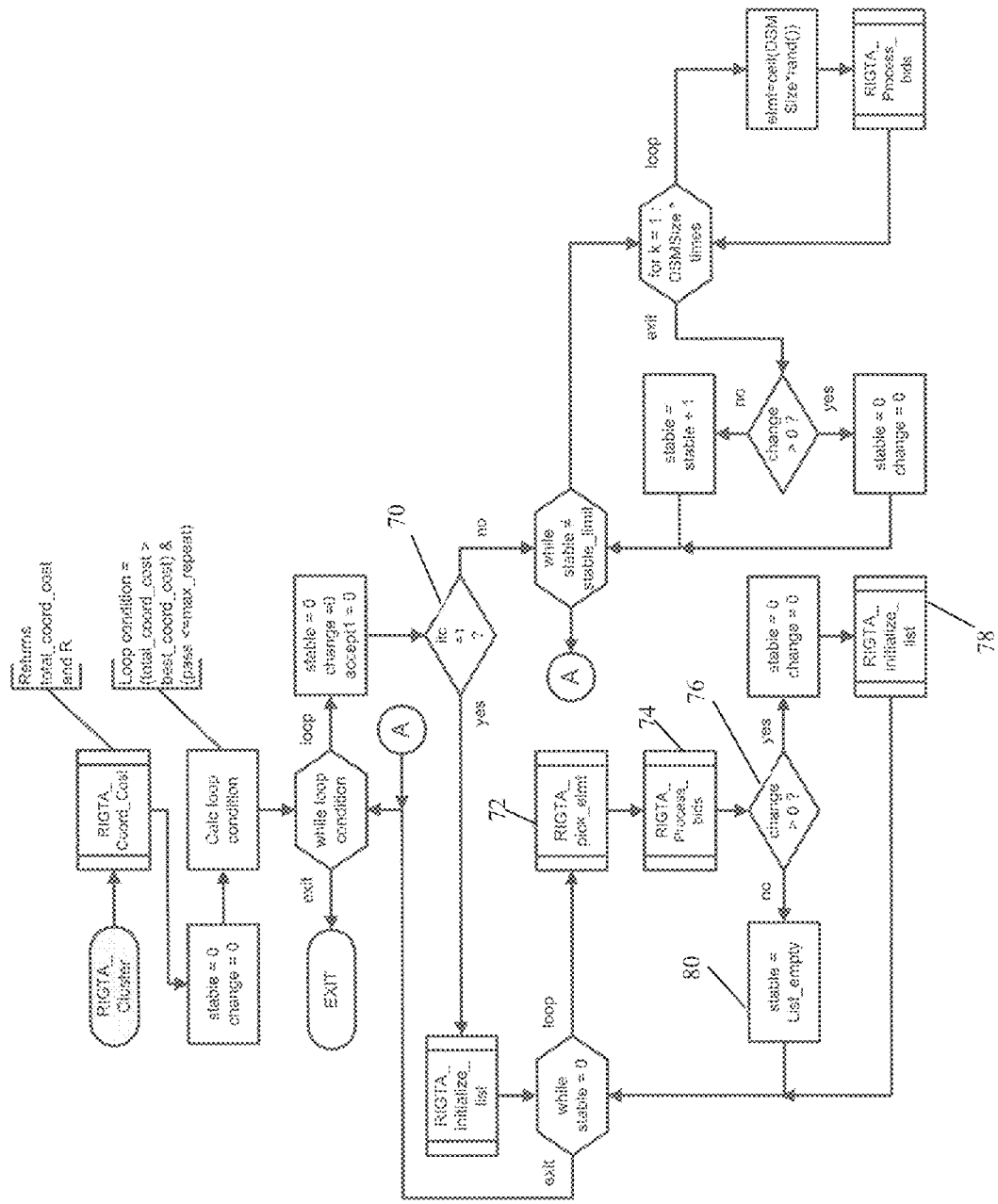
FIG. 15 is a flowchart of a procedure for performing clustering of elements.
Figure 21:
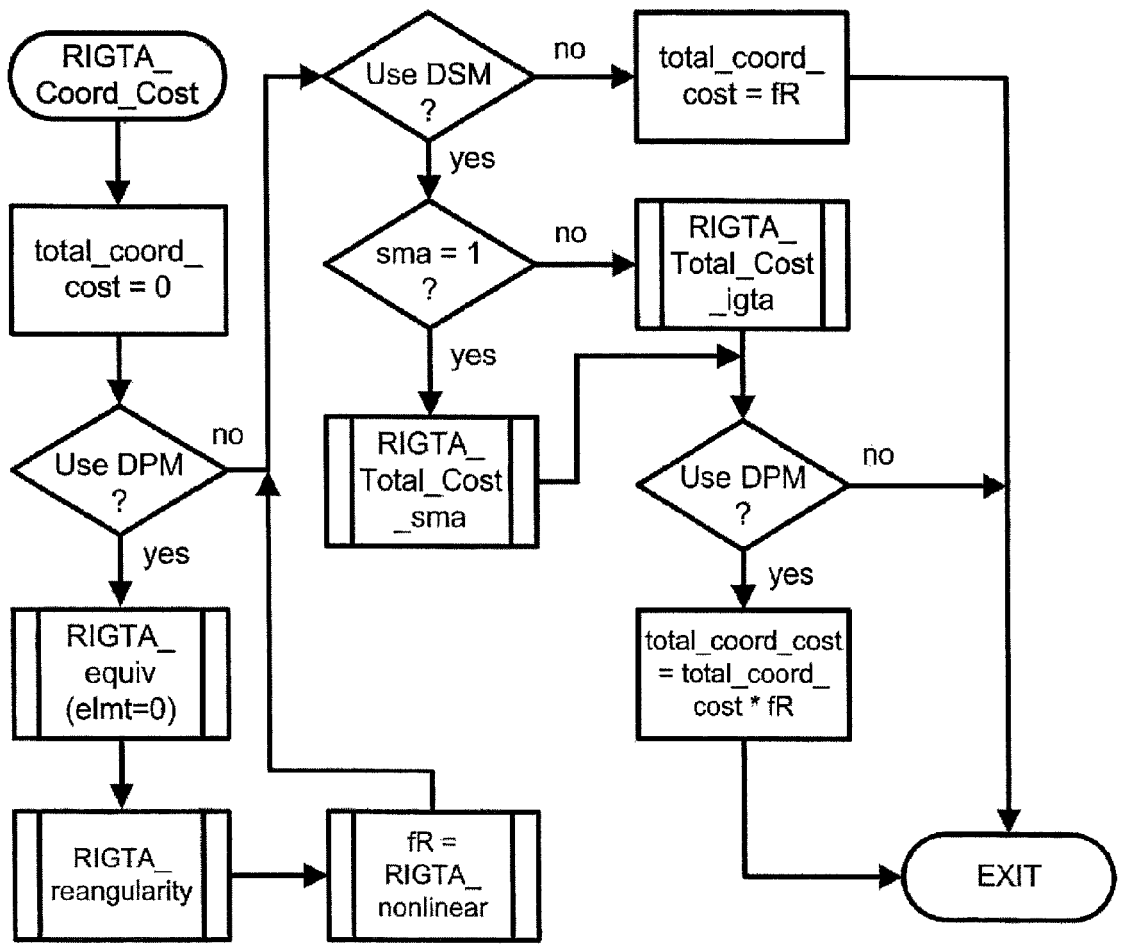
FIG. 21 is a flowchart of a procedure to calculate coordination cost as a fitness function reflecting both DPM and DSM.
Figure 22:
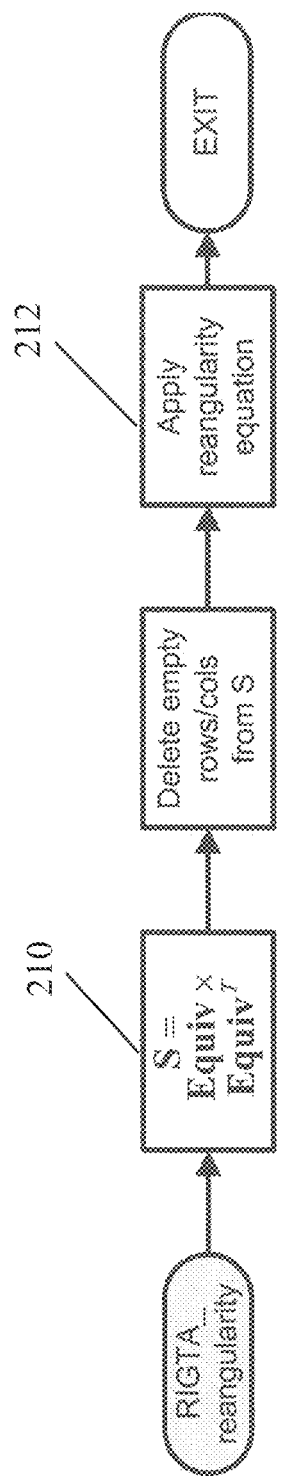
FIG. 22 is a flowchart of a procedure to calculate Reangularity of a clustering arrangement in DPM.

FIG. 15 is a more detailed flowchart showing an exemplary embodiment for executing the clustering loop (steps 32-66) of FIG. 11. Moreover, FIG. 21 is a more detailed flowchart showing an exemplary embodiment for calculating coordination cost as a fitness function reflecting both DPM and DSM.

Figure 13:
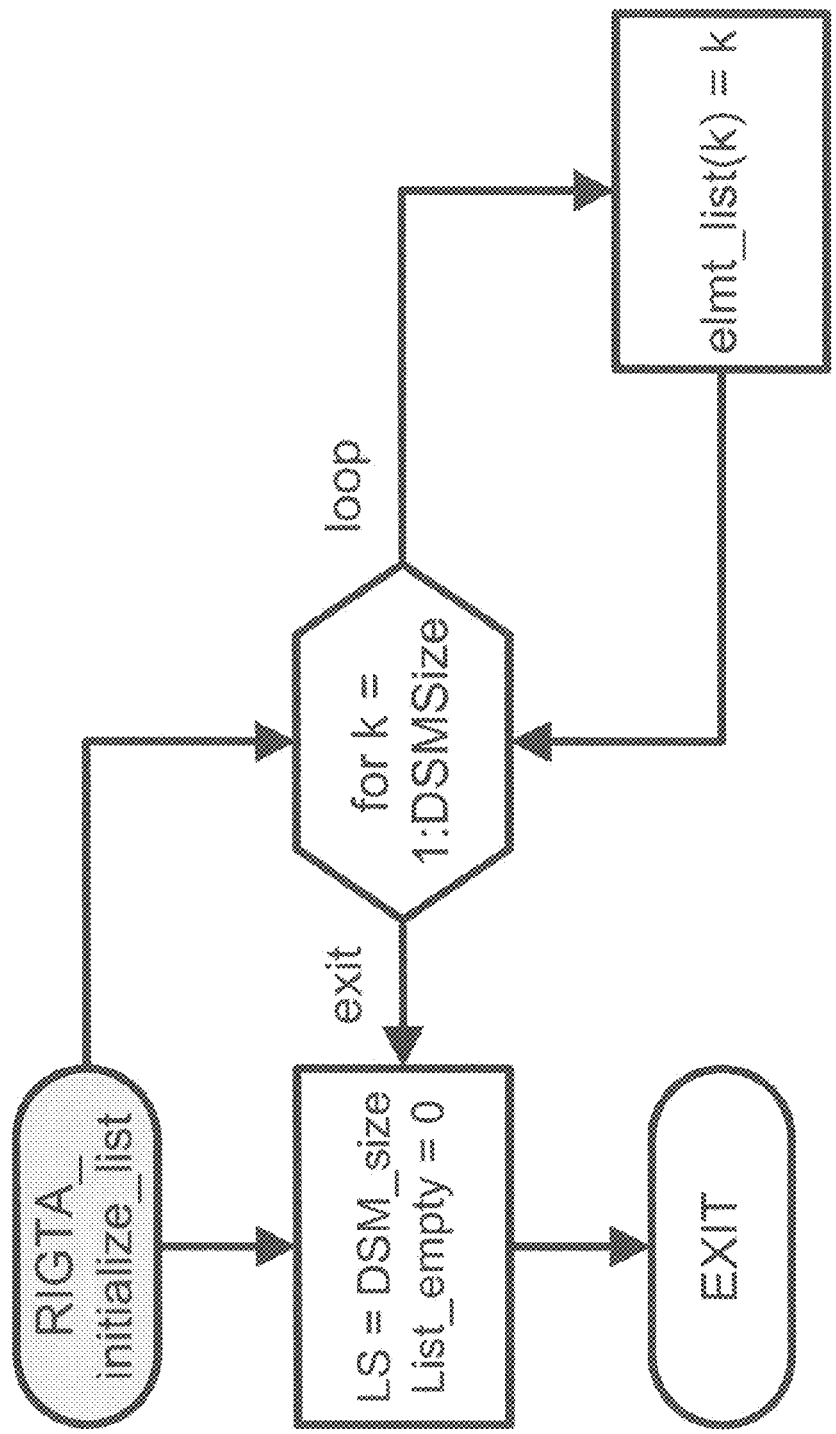
FIG. 13 is a flowchart of a procedure for initializing the list of untried elements.
Figure 14:
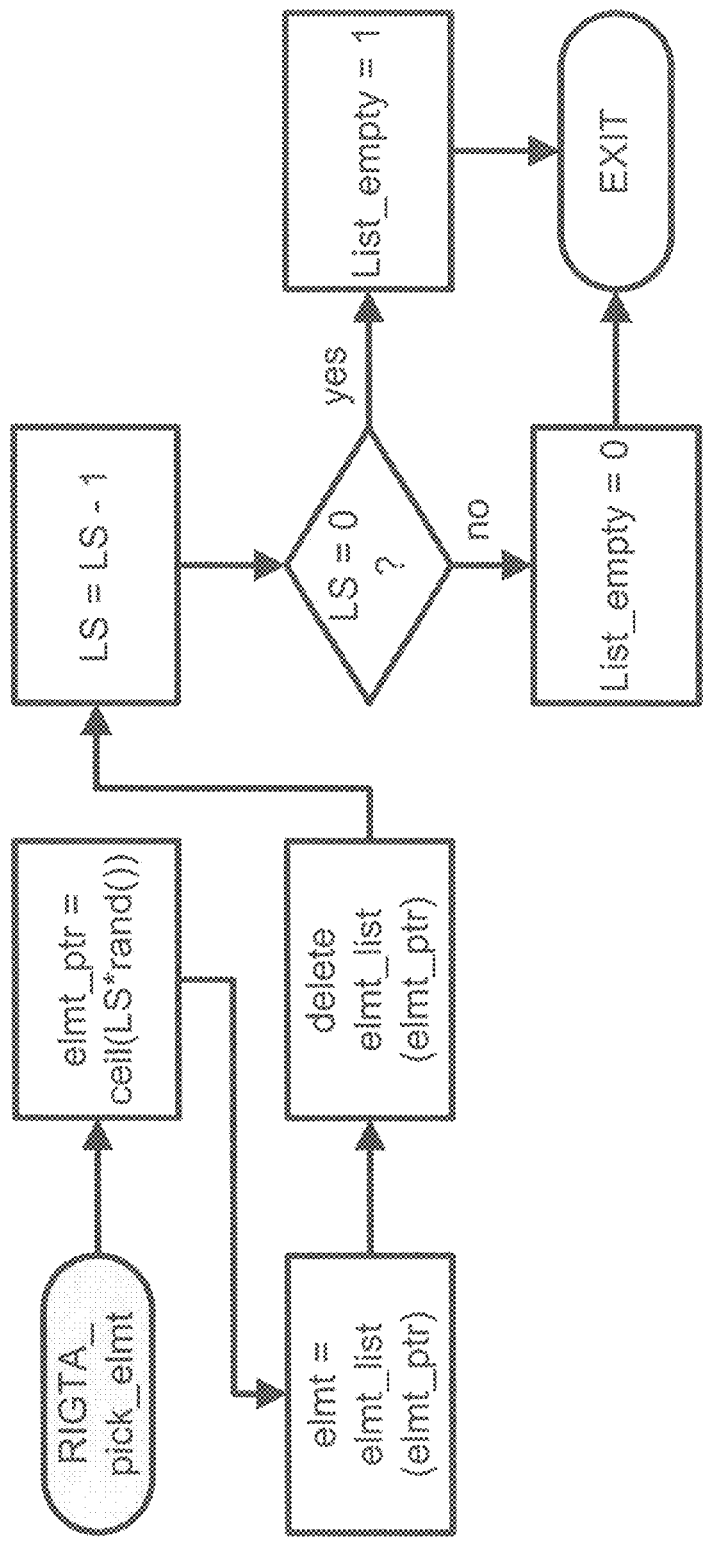
FIG. 14 is a flowchart of a procedure for picking an element at random from a list of untried elements, and then deleting the element from the list.
Figure 17:
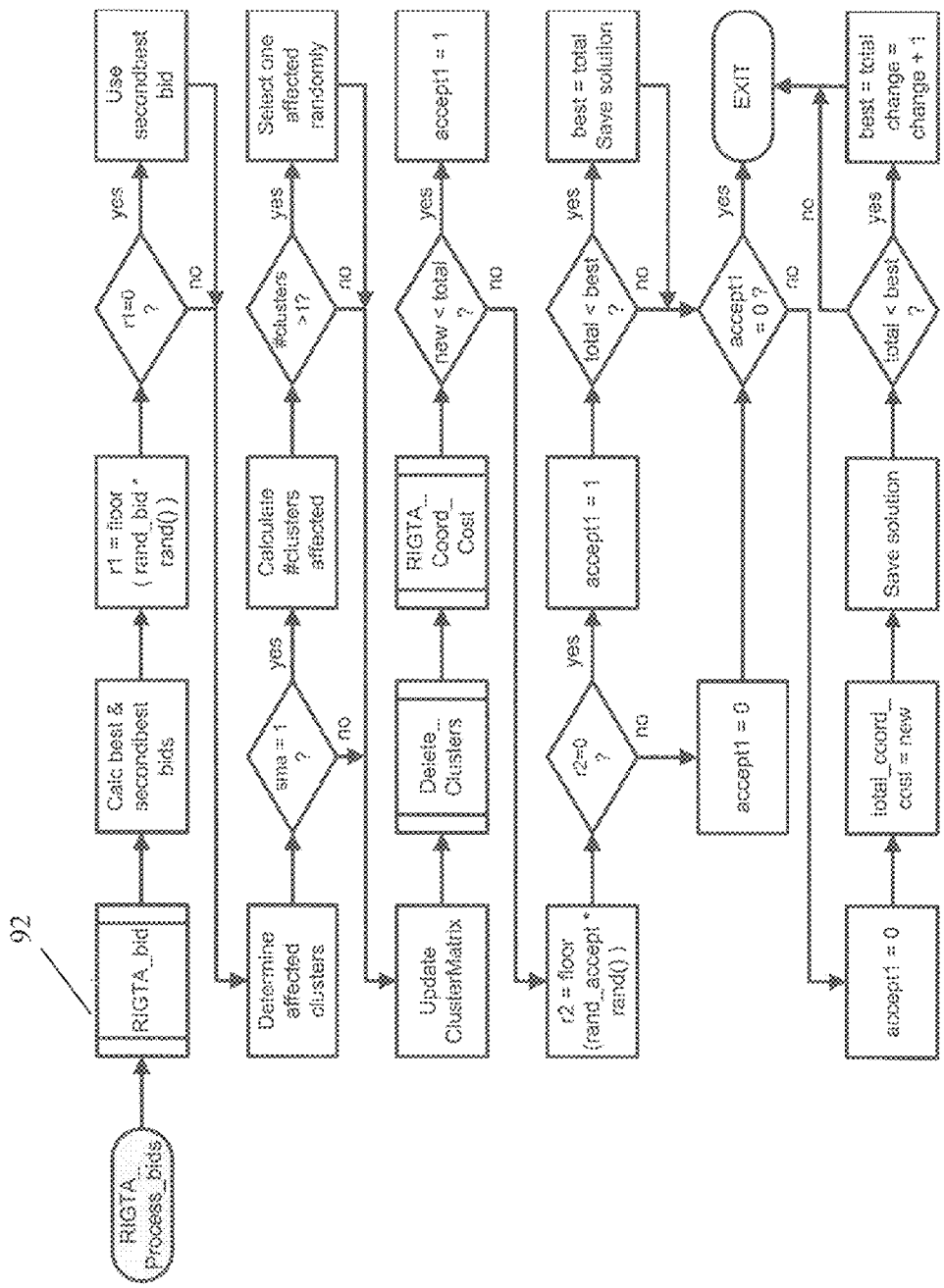
FIG. 17 is a flowchart of a procedure to process cluster bids in each iteration.
Figure 18:
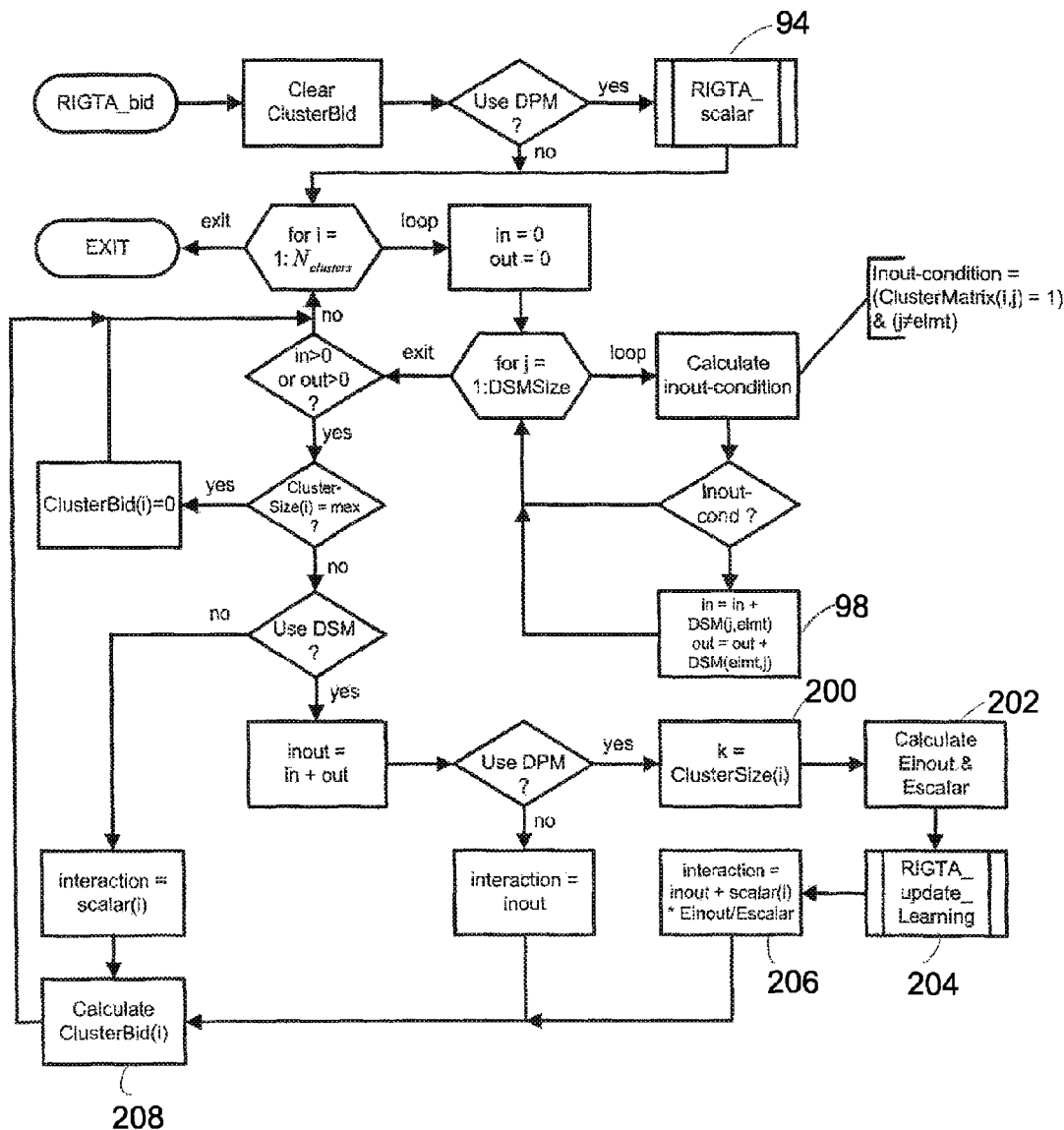
FIG. 18 is a flowchart of a procedure to calculate cluster bids in each iteration.
Figure 19:
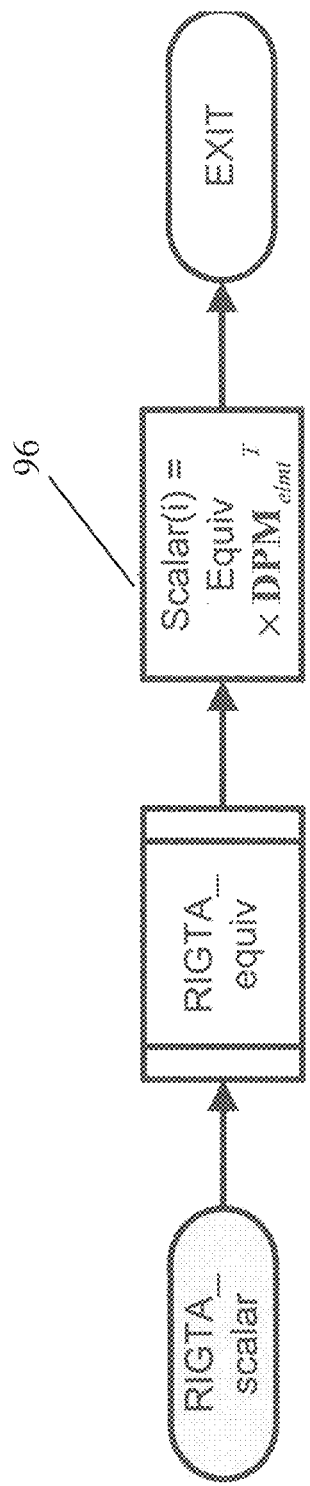
FIG. 19 is a flowchart of a procedure to calculate a scalar product between a single element and a cluster.
Figure 20:
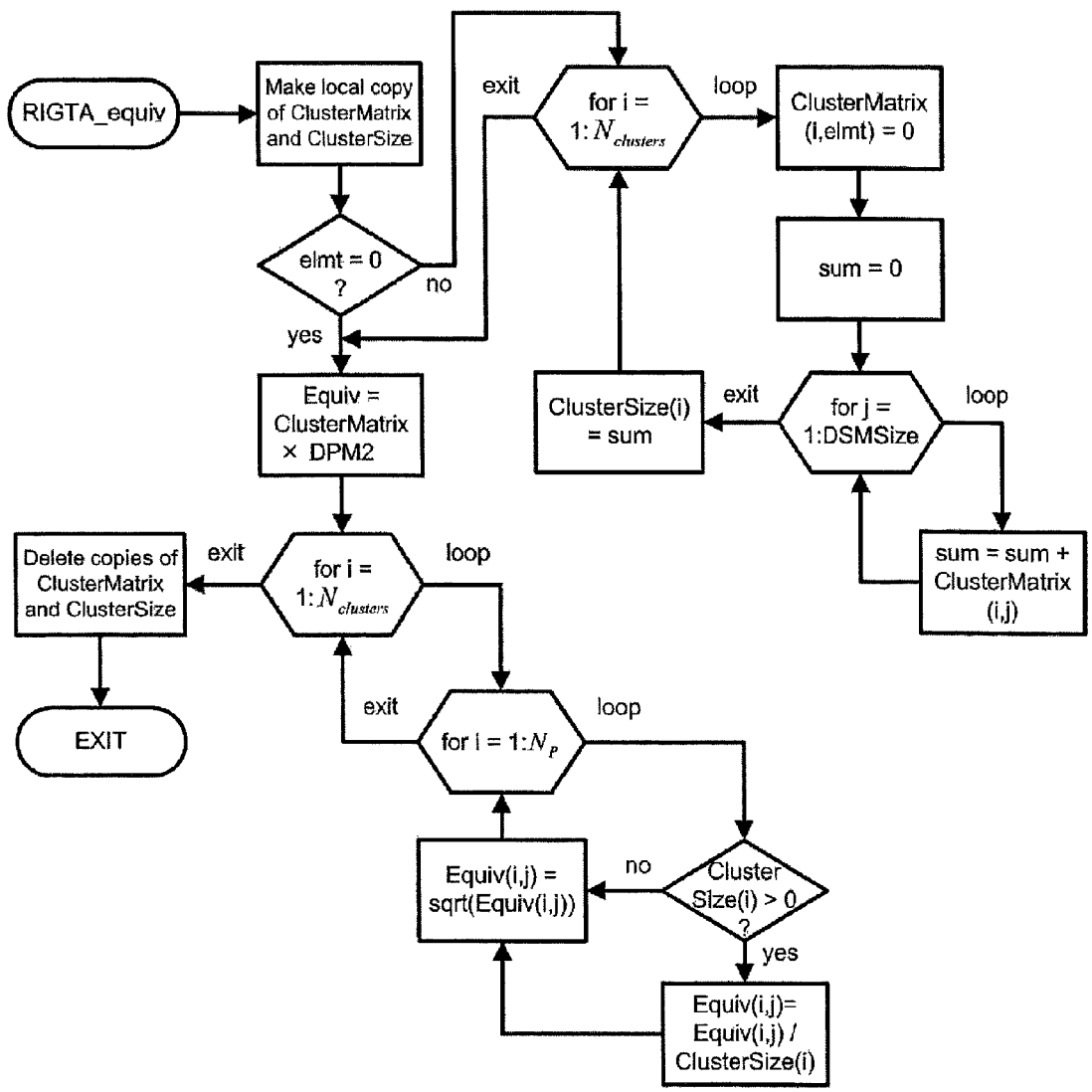
FIG. 20 is a flowchart of a procedure to calculate an equivalent matrix scoring for a cluster in order to represent the cluster in the same way as a single component.

For example, FIG. 15 includes step 70, at which a user may decide whether to use the improved termination criterion algorithm of FIGS. 13 and 14. If yes, then the element is not selected completely randomly in step 32, but rather is selected randomly only from a list of untried elements in step 72. At step 74, an exemplary procedure for processing bids is presented in a more detailed flowchart at FIG. 17. Referring to FIG. 17, at step 92, an exemplary procedure to calculate ClusterBid in each iteration is presented in a more detailed flowchart at FIG. 18. Referring to FIG. 18, at step 94, an exemplary procedure to calculate scalar is presented in a more detailed flowchart at FIG. 19. As shown in FIG. 19, Equation 29 is applied at step 96.

Referring to FIG. 18, Equation 4 is applied at step 98. Equation 5 is applied at step 200. Equations 19 and 20 are applied at step 202. Equations 17 and 18 are applied at step 204. Equation 9 is applied at step 206. Equation 10 is applied at step 208.

At step 76 of FIG. 15, a determination is made regarding whether there is a change in the clustering arrangement (e.g., whether an element is moved to a different cluster that has the highest ClusterBid). If there is a change, then the list of untried element is reset at step 78 so that all the elements are considered untried for the changed clustering arrangement. If there is no change, then the clustering arrangement is considered stable if the list of untried elements is empty at step 80. If the list of untried elements is not empty, then the loop resumes at step 72, where an untried element is picked for evaluation in the current clustering arrangement.

If at step 70 a user decides not to use the ITC algorithm of FIGS. 13 and 14, then the clustering procedure of FIG. 15 proceeds as shown on the right side of the flowchart, until a set limit of number of iterations is reached.

The output in step 68 may be a report displayed on graphical user interface or a printed report, for example, that displays an optimized clustering arrangement, having a low Total Cost and high Reangularity. The clusters group together subsets of components that may be designed as a module. These groups represent a balance of similarities and interactions shared by the components. Thus, the described methods use two input matrices, a Design Structure Matrix and a Domain Mapping Matrix (which in one embodiment is a Design Property Matrix) to consider comprehensive array of inputs from multiple sources and return a single optimized clustering configuration.

One exemplary application for the disclosed algorithms is in a product architecture method, wherein the output clustering arrangements are used to drive product architecture steps. In an exemplary application, each cluster of components represents a subpart of the product that is structurally designed, modified, and produced as a unit. These separate units are then assembled to form the whole product.

Figure 16:
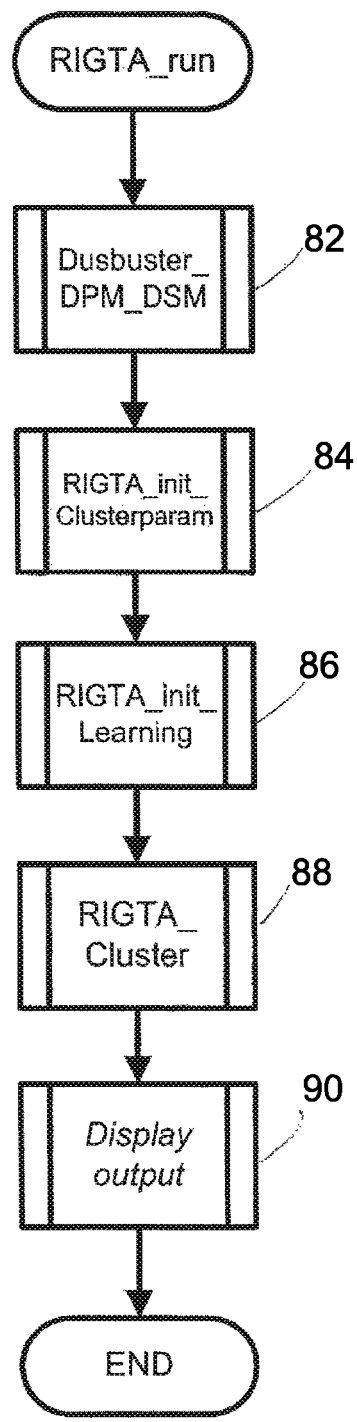
FIG. 16 is a flowchart of an exemplary embodiment of a main program to read initial matrices, set up clustering and learning parameters, call a clustering procedure and display results.

FIG. 16 is a flowchart of an exemplary embodiment of a main program to read initial matrices, set up clustering and learning parameters, call a clustering procedure and display results. Step 82 sets up the input matrices for the program, which in an exemplary embodiment are DPM and DSM matrices for the components and product properties of a Dustbuster handheld vacuum cleaner. Step 84 is similar to step 30 of FIG. 11. Step 86 uses Equations 12-16 to make initial approximations. Step 88 refers to the exemplary clustering procedure shown in the flowchart of FIG. 15. Step 90 is similar to step 68 of the flowchart of FIG. 11.

Figure 26:
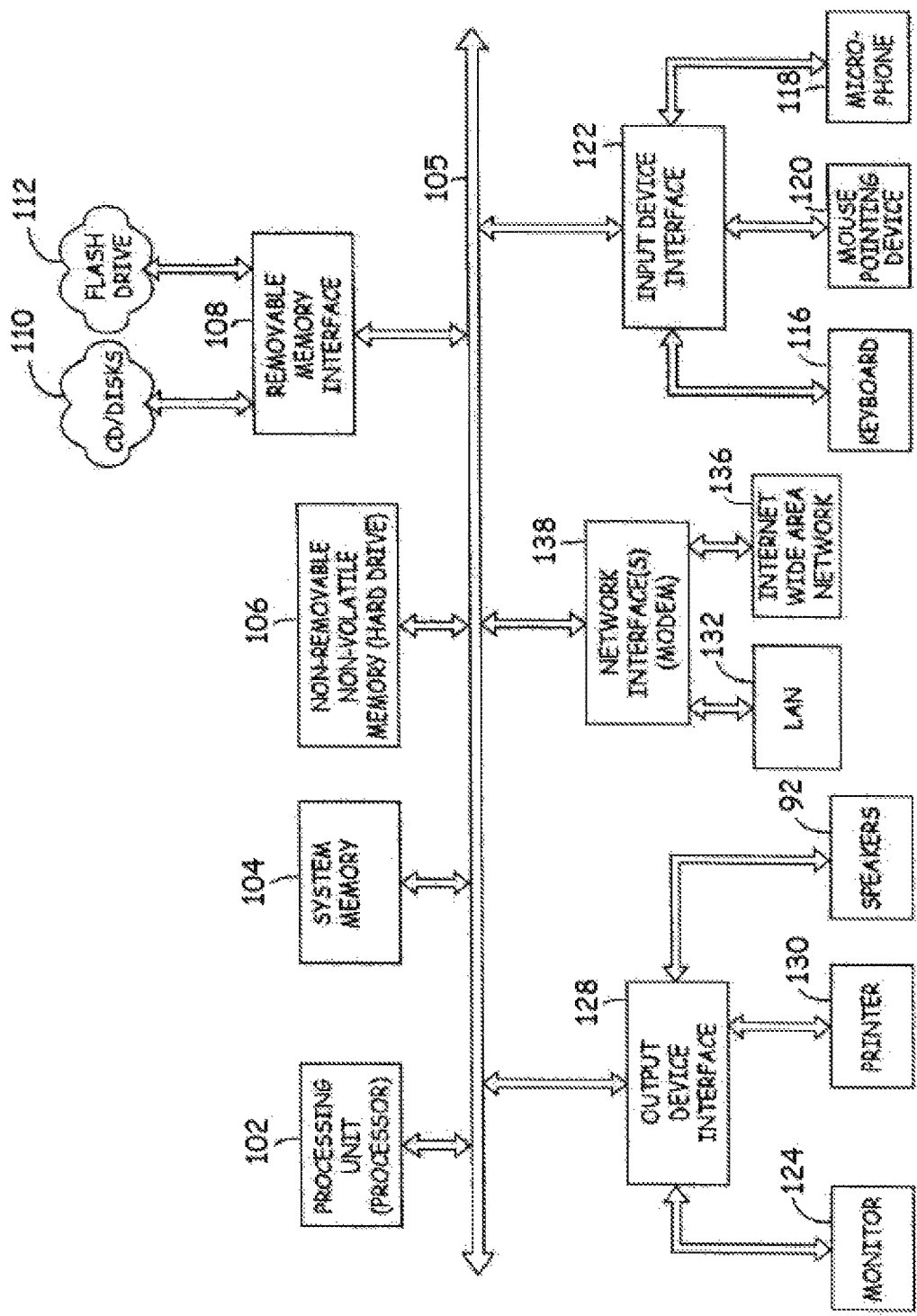
FIG. 26 is a schematic diagram illustrating components of a computer suitable for operating at least portions of the disclosed method.

The method and system disclosed and illustrated herein are implementable on a computer device or system of the type schematically illustrated in FIG. 26. As shown components of computer 100 include, but are not limited to, a hardware components comprising a processing unit 102, system memory 104, and a system bus 105 that couples various system components including the system memory 104 to the processing unit 102. The system bus 105 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. The disclosed algorithms may be implemented in virtually any high-level computer programming language, including but not limited to such languages as C, C++, Java or Matlab, or in a low-level language such as microprocessor assembly language code.

Computer 100 typically includes a variety of computer storage media or storage hardware, including both volatile and nonvolatile, removable and non-removable media. Computer storage media includes but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information or instructions and which can be accessed by computer 100. Thus, the IGTA, IGTA-plus, and R-IGTA and other algorithms described are stored on one or more of the computer storage media for implementing product design based upon input parameters.

For example as shown in FIG. 26, the computer device 100 includes non-removable, nonvolatile magnetic media 106, such as a hard drive and removable memory 108 such an optical CD ROM 110, flash memory 112 and other memory as previously discussed. The drives and their associated computer storage media or memory, provide storage of computer readable instructions, data structures, program modules and other data for the computer 100. As described, the algorithms and modules can be implemented via circuitry of the processing unit 102 based upon instructions stored on the one or more storage devices 106, 108.

A user may enter commands and information into the computer 100 through input devices such as a keyboard 116, a microphone 118, and a pointing device 120, such as a mouse, trackball or touch pad. Other input devices (not shown) may include a joystick, game pad, satellite dish, scanner, or the like. These and other input devices are often connected to the processing unit 102 through an input interface 122 that is coupled to the system bus 105, but may be connected by other interface and bus structures, such as a parallel port, game port or a universal serial bus (USB). A monitor 124 or other type of display device is also connected to the system bus 105 via an output device interface 128. In addition to the monitor 124, computers may also include other peripheral output devices such as printer 130 and speakers 134, which may also be connected through the output device interface 128.

The computer 100 is typically operated in a networked environment. The network connections depicted in FIG. 26 include a local area network (LAN) 132 and a wide area network (WAN) or Internet 136. When used in a WAN or other networking environment, the computer 100 typically includes a modem 138 or other network interface for establishing communications to the network or Internet or in a cloud environment. Although FIG. 26 schematically illustrates a computer device, application is not limited to the particular structure or computer device shown.

Application of embodiments described herein is not limited to a particular computer device and embodiment described herein can be implemented on a laptop computer, a personal computer, a tablet device, personal digital assistant (PDA) or other mobile device. Further, application is not limited to a computer device include all of the components illustrated in FIG. 26. As appreciated by those skilled in the art, application of the product design system is not limited to illustrative embodiments disclosed herein and different embodiment can be implemented as appreciated by those skilled in the art.

In one aspect, a method for optimizing the simultaneous clustering in a design structure matrix and a domain mapping matrix is disclosed. The design structure matrix is a square matrix of having a number rows and the same number of columns. In an exemplary embodiment, each of the rows and columns refers to a component or element of an apparatus. The domain mapping matrix is a rectangular or square interdomain matrix that shares a domain with the design structure matrix, so that the domain mapping matrix has the same number of rows as the design structure matrix. The domain mapping matrix may have any number of columns. In an exemplary embodiment, each of the rows refers to a component or element of a product and each of the columns of the domain mapping matrix refers to a product property. In an exemplary embodiment the domain mapping matrix is a Design Property Matrix (DPM), Module Indication Matrix (MIM), or a relation between individual technical solutions and functions. In an exemplary embodiment, each matrix entry is a numerical quantity. The method uses a computer processor to group one or more elements into a cluster arrangement, using a plurality of entries from each of the design structure matrix and the domain mapping matrix.

In an exemplary embodiment, a disclosed method for performing a clustering algorithm includes the following steps: defining an initial clustering arrangement whereby each element is placed in its own cluster, or whereby each element is randomly allocated to a number of clusters of arbitrary size; using a matrix based format for encoding the clustering arrangement in a one-dimensional or two-dimensional matrix format; randomly selecting one or several elements in any of the clusters and using an objective function to determine whether moving the one or more elements to another cluster reduces the value of the objective function; moving the one or several elements to the cluster that reduces the objective function by the largest amount; and storing the clustering arrangement as the best so far, if the new value of the objective function is lower than the lowest value found so far.

In an exemplary method, a step includes calculating an indication of the strength of an interaction between a cluster and a component. In an exemplary embodiment, this calculation includes a penalty for large size clusters to encourage smaller clusters. In an exemplary embodiment, this calculation operates on both the domain mapping matrix and the design structure matrix. This allows for locally informed cluster grouping decisions without requiring all the information that goes into the objective functions. In an exemplary embodiment, this calculation is referred to as Cluster-Bid.

An exemplary algorithm includes a feature that suppresses multicluster allocation; therefore, if two or more clusters reduce the value of the objective function by the same amount, the algorithm randomly or otherwise assigns the selected element to only one of those clusters.

In an exemplary embodiment, the algorithm terminates if a pre-defined termination criterion is met; if not, then the algorithm repeats the procedure from the step where an element is selected at random. In an exemplary method, a termination criterion keeps a list of elements that have not yet been tried. As elements are tried, they are removed from the list. If an element is moved to a different cluster, the list is reset so that all the elements may be tried with the new clustering arrangement. When the list is empty, the algorithm terminates. In other methods, the algorithm terminates when either a maximum number of allowed iterations has been reached or the overall objective function has not changed for a pre-set number of iterations.

In an exemplary embodiment, the objective function for the design structure matrix is based on the strength of the interactions of components that belong to the same cluster and the strength of interactions of components that belong to different clusters. In an exemplary embodiment, the interactions between components belonging to the same cluster are weighted by a value calculated based on the number of elements in the cluster and the interactions between components belonging to different clusters are weighted by a value calculated based on the total number of elements.

In an exemplary embodiment, the objective function for the domain mapping matrix is based on the calculation of pairwise scalar products between rows. One step in the calculation involves represent the scoring of several components that belong to the same cluster by a single equivalent row of scores so that the cluster can be treated in the same way as a single component. In other words the values of individual rows of numerical data in the domain mapping matrix are replaced with one single row of data representing the all the elements in the cluster. In another step, the objective function is calculated using pairwise scalar products of the rows representing each of the clusters. An exemplary method uses the Reangularity formula defined by Suh (1990). In an exemplary method, the scheme used for normalizing the two terms of the scalar product includes a self-adjusting prediction based on cluster size. With this learning behavior, the predicted or expected value of the scalar product becomes more accurate as more iterations are performed.

In an exemplary embodiment, a mathematical formula is used to calculate a single value for the overall objective function used in the optimization, based on two different objective functions calculated for each of the two individual matrices, the design structure matrix and the domain mapping matrix. The overall objective function is designed to minimize a normalized sum of the interactions between a component and a candidate cluster in the design structure matrix and maximize scalar product of the same component and the same candidate cluster in the domain mapping matrix (e.g., the value of Reangularity of the domain mapping matrix). In an exemplary embodiment, the overall objective function is a ratio between the component interactions in the design structure matrix and a non-linear function of Reangularity. In an exemplary embodiment, the non-linear function is a polynomial, monotonously decreasing function. Other possible functions include, for example, exponential decreasing functions, segments of logistical functions, inverse trigonometric functions including the arc-tangent function, inverse hyperbolical functions, and arcs of circles or ellipses.

Thus, this disclosure describes a method for optimizing simultaneous clustering in a design structure matrix and a domain mapping matrix. An overall objective function is described for assessing a fitness of the clustering solution. The overall objective function comprises contributions from two separate objective functions: a first objective function for the design structure matrix and a second objective function for the domain mapping matrix. As described above, in an exemplary embodiment, the first objective function for the design structure matrix is Total Cost, the second objective function for the domain mapping matrix is Reangularity, and the overall objective function is a ratio of the first objective function and the second objective function.

However, many other first, second and overall objective functions can be used for assessing fitness of a clustering solution in the described methods for optimizing simultaneous clustering in a design structure matrix and a domain mapping matrix. For example, in U.S. Pat. No. 7,280,986, which is hereby incorporated by reference, Goldberg uses an objective function referred to as "Minimum Description Length," described in Equation 3 at the top of column 7. Goldberg's Minimum Description Length function is described for use with a design structure matrix but can also be extended for use with a domain mapping matrix. Thus, a first Description Length may be obtained as the first objective function for the design structure matrix. A second Description Length may be obtained as the second objective function for the domain mapping matrix. An overall objective function can be a sum of the first Description Length and the second Description Length.

This disclosure is also directed to a physical computer readable storage medium for non-transitory storage of instructions executable by a computer processor to carry out the disclosed method steps. Examples of such media include a compact disc (CD), digital video disc (DVD), hard drive, and flash memory drive, and other magnetic media, for example. Moreover, this disclosure describes a computer system including a processor and memory that stores instructions executable by the processor for performing the disclosed method steps.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A computer implemented method comprising:
   providing a square design structure matrix having a number of rows and a number of columns equal to the number of rows, wherein each row represents one of a plurality of elements, wherein each entry of the design structure matrix is a numerical quantity;
   providing a domain mapping matrix having a number of rows equal to the number of rows of the design structure matrix, each row having an identical representation of one of the plurality of elements as a corresponding row of the design structure matrix, the domain mapping matrix having any number of columns, wherein each entry of the domain mapping matrix is a numerical quantity, wherein each of the elements corresponds to a component of an apparatus, and wherein each column of the domain mapping matrix represents one of a plurality of product properties of the apparatus;
   using a computer processor to group one or more elements into a cluster arrangement, using a plurality of entries from each of the design structure matrix and the domain mapping matrix,
   wherein the plurality of elements is grouped into a plurality of clusters, and wherein none of the plurality of elements is grouped into more than one cluster, and
   wherein each entry of the design structure matrix corresponds to a strength of interaction between two of the plurality of elements;
   calculating a first objective function for the design structure matrix, wherein intracluster interactions between each pair elements of a first cluster are weighted by a value calculated based on a number of elements in the first cluster, and wherein intercluster interactions between pairs of elements of different clusters are weighted by a value calculated based on a total number of the plurality of elements; and
   using a modular product architecture to manufacture a corresponding product, wherein the modular product architecture is generated according to at least the first objective function, and wherein each cluster of the plurality of clusters in the cluster arrangement is treated as a subsystem in the modular product architecture.

2. The computer implemented method of claim 1 wherein the domain mapping matrix is a Design Property Matrix or a Module Indication Matrix.

3. The computer implemented method of claim 1 further comprising:
   maintaining a list of unselected elements of the plurality of elements;
   selecting an element from the list; and
   deleting the selected element from the list.

4. The computer implemented method of claim 3 wherein moving the selected element results in resetting the list of unselected elements to include all of the plurality of elements.

5. The computer implemented method of claim 1 wherein an overall objective function comprises the first objective function obtained from the design structure matrix and a second objective function obtained from the domain mapping matrix.

6. The computer implemented method of claim 5 wherein at least one of the first objective function and the second objective function is a Minimum Description Length.

7. The computer implemented method of claim 1 further comprising: calculating a second objective function for the domain mapping matrix, comprising representing scoring of a plurality of elements of the first cluster by a single equivalent row of scores.

8. The computer implemented method of claim 7 wherein calculating a second objective function for the domain mapping matrix further comprises using pairwise scalar products of rows representing each of the plurality of clusters.

9. The computer implemented method of claim 8 comprising using a Reangularity equation.

10. The computer implemented method of claim 8 wherein normalizing terms of a scalar product comprises a self-adjusting prediction based on cluster size.

11. The computer implemented method of claim 8 wherein the method calculates an overall objective function based on the first objective function for the design structure matrix and the second objective function for the domain mapping matrix.

12. The computer implemented method of claim 11 wherein the overall objective function is a ratio having a numerator of a normalized sum of interactions between a selected element and the first cluster in the design structure matrix and a denominator of a score calculated from a Reangularity equation.

13. The computer implemented method of claim 12 wherein the denominator is replaced by a multiplicative factor that corresponds to a non-linear decreasing function of Reangularity.

14. The computer implemented method of claim 1 comprising defining an initial clustering arrangement wherein each element is placed in one of several randomly defined clusters of arbitrary size.

15. The computer implemented method of claim 1 further comprising forcing allocation of an element of the plurality of elements to only one cluster of the plurality of clusters, which results in the first objective function for the design structure matrix being calculated more efficiently.

16. The computer implemented method of claim 15 wherein the forcing of the allocation of an element of the plurality of elements to only one cluster of the plurality of clusters occurs according to at least one of suppress multi-cluster allocation (SMA) and improved termination criterion (ITC).

* * * * *